(12) United States Patent
Viramontez

(10) Patent No.: US 10,403,125 B2
(45) Date of Patent: *Sep. 3, 2019

(54) INCIDENT COMMAND SYSTEM FOR SAFETY/EMERGENCY REPORTING SYSTEM

(71) Applicant: ICS4Schools, LLC, San Jose, CA (US)

(72) Inventor: Jose David Viramontez, San Jose, CA (US)

(73) Assignee: ICS4SCHOOLS, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/247,850

(22) Filed: Jan. 15, 2019

(65) Prior Publication Data
US 2019/0172337 A1 Jun. 6, 2019

Related U.S. Application Data

(63) Continuation-in-part of application No. 15/863,679, filed on Jan. 5, 2018, now Pat. No. 10,181,257.

(60) Provisional application No. 62/442,854, filed on Jan. 5, 2017, provisional application No. 62/720,413, filed on Aug. 21, 2018.

(51) Int. Cl.
| | |
|---|---|
| G08B 25/10 | (2006.01) |
| G08B 25/00 | (2006.01) |
| H04L 29/08 | (2006.01) |
| H04M 1/725 | (2006.01) |
| H04W 4/14 | (2009.01) |
| G08B 25/01 | (2006.01) |
| H04W 4/12 | (2009.01) |
| H04W 4/90 | (2018.01) |

(52) U.S. Cl.
CPC .......... *G08B 25/10* (2013.01); *G08B 25/005* (2013.01); *G08B 25/016* (2013.01); *H04L 67/26* (2013.01); *H04M 1/72538* (2013.01); *H04M 1/72552* (2013.01); *H04M 1/72572* (2013.01); *H04W 4/12* (2013.01); *H04W 4/14* (2013.01); *H04W 4/90* (2018.02)

(58) Field of Classification Search
None
See application file for complete search history.

(56) References Cited

U.S. PATENT DOCUMENTS

| | | | |
|---|---|---|---|
| 5,423,574 A | 6/1995 | Forte-Pathroff | |
| 6,292,670 B1 * | 9/2001 | Kauria | H04W 36/0009 455/518 |
| 7,233,240 B2 | 6/2007 | Phillips | |
| 7,411,493 B2 | 8/2008 | Smith | |
| 7,714,725 B2 | 5/2010 | Medve et al. | |
| 8,068,022 B2 | 11/2011 | Ben-Itzhak et al. | |
| 8,219,110 B1 | 7/2012 | White et al. | |

(Continued)

*Primary Examiner* — Curtis J King
(74) *Attorney, Agent, or Firm* — Chernoff Vilhauer LLP

(57) ABSTRACT

An incident command system (ICS) of the present disclosure may include an ICS application running on a network that includes multiple mobile digital devices and one or more servers. Each of the mobile digital devices may be used by a respective agent of a venue to report an incident and to carry out one or more procedures associated with the incident response. One such procedure is a child release process, in which a plurality of children may be efficiently and systematically reunited with adult guardians.

20 Claims, 21 Drawing Sheets

(56) References Cited

U.S. PATENT DOCUMENTS

| | | |
|---|---|---|
| 8,624,727 B2 | 1/2014 | Saigh et al. |
| 8,862,092 B2 | 10/2014 | Reitnour |
| 9,189,942 B2 | 11/2015 | Roston |
| 9,361,784 B1 | 6/2016 | Alamri |
| 9,454,889 B2 | 9/2016 | Kerning |
| 9,576,491 B1 | 2/2017 | Wu et al. |
| 9,883,370 B2 | 1/2018 | Kerning et al. |
| 10,176,692 B1 | 1/2019 | Vesterman et al. |
| 2002/0116247 A1 | 8/2002 | Tucker et al. |
| 2004/0190753 A1 | 9/2004 | Sakagami et al. |
| 2004/0190754 A1 | 9/2004 | Sakagami et al. |
| 2008/0284587 A1* | 11/2008 | Saigh ............... H04M 1/72541 340/539.13 |
| 2009/0276489 A1* | 11/2009 | Ragno ................ G06F 19/325 709/203 |
| 2010/0159976 A1 | 6/2010 | Marocchi et al. |
| 2011/0130112 A1* | 6/2011 | Saigh ................ H04M 1/7253 455/404.1 |
| 2012/0046009 A1* | 2/2012 | Persson ................ A42B 3/046 455/404.2 |
| 2012/0181332 A1 | 7/2012 | Langley et al. |
| 2012/0238234 A1 | 9/2012 | Duarte |
| 2012/0329420 A1 | 12/2012 | Zotti et al. |
| 2013/0040600 A1 | 2/2013 | Reitnour et al. |
| 2013/0138746 A1 | 5/2013 | Tardelli et al. |
| 2013/0162397 A1 | 6/2013 | Cano et al. |
| 2013/0183924 A1* | 7/2013 | Saigh .................... H04W 4/029 455/404.2 |
| 2015/0189056 A1* | 7/2015 | Magi ..................... G06F 1/1652 455/566 |
| 2015/0230072 A1* | 8/2015 | Saigh ..................... H04W 4/90 455/404.1 |
| 2015/0371167 A1 | 12/2015 | Hall et al. |
| 2017/0337528 A1 | 11/2017 | Hall et al. |
| 2018/0012471 A1* | 1/2018 | Bauer ................ G08B 21/0269 |
| 2018/0040181 A1 | 2/2018 | Groeger et al. |
| 2018/0075720 A1* | 3/2018 | Davies .................... H04W 4/90 |

* cited by examiner

INCIDENT COMMAND SYSTEM FOR SAFETY/EMERGENCY REPORTING SYSTEM

CROSS-REFERENCES

This application is a continuation-in-part of U.S. patent application Ser. No. 15/863,679, filed on Jan. 5, 2018 and entitled "Incident Command System/Student Release System," which claims the benefit of U.S. Provisional Patent Application Ser. No. 62/442,854, filed on Jan. 5, 2017 and entitled "Child Release Systems and Methods." Additionally, this application claims the benefit of U.S. Provisional Patent Application Ser. No. 62/720,413, filed on Aug. 21, 2018 and entitled "Incident Command System/Student Release System." The complete disclosures of the above applications are hereby incorporated by reference for all purposes.

FIELD

This disclosure relates to incident command systems (ICSs). More specifically, the disclosed embodiments relate to systems and methods for communicating, organizing, and documenting emergency response actions, such as the release of a group of children to their respective guardians during an emergency event.

INTRODUCTION

In the event of a natural or man-made emergency, there usually are multiple responders that need to report and communicate information about the emergency. In some emergencies, a group of children or other individuals may need to be reunited with their respective parents or guardians. Children often spend a large part of the day away from their guardians, whether at a school, daycare, community center, place of worship, or the like. If an unexpected emergency event occurs, the adults responsible for the children may need to retrieve them quickly. Such a situation may be chaotic depending on the nature of the emergency, which may be occurring at the same location as the children (or nearby). Additionally, the organization in charge of the children at the onset of the emergency may be required to provide an official accounting of which children were present, who came to pick up each child, and when they were retrieved.

Existing solutions to the problem of reporting emergencies include the use of radios to report and communicate information about the emergencies. Such a communication system is unreliable and has many opportunities for errors. For example, the responders may not clearly hear everything said via the radios. Additionally, existing solutions to the problem of organizing and documenting the release of children to responsible adults during an emergency include manual recording of information. That is, a person writes down on a piece of paper the names of the adults who came to retrieve a child. Such a rudimentary system is unreliable and has many opportunities for errors. Opportunities for confusion are even greater when the location of the children, the entry point for adults, and the exit point for children are all in the same area.

There is a need for a straightforward system that addresses the need for efficiency, reliability, and memorialization in the area of incident reporting, response, and coordination.

SUMMARY

The present disclosure provides systems, apparatuses, and methods relating to incident command systems and related methods. Some embodiments provide a data processing system for carrying out a release of children from a venue. In some embodiments, the data processing system may include one or more processors and one or more memory devices. The data processing system may additionally include an incident response system application comprising a plurality of instructions stored in the one or more memory devices and executable by the one or more processors to notify responders of an emergency by receiving, from a first mobile digital device (MDD) of a group of associated MDDs, a report of an incident in progress. The report may include a visual map selection indicating location of the incident. The plurality of instructions is additionally executable by the one or more processors to notify responders of an emergency by automatically recording a timestamped log entry of the report. The plurality of instructions is further executable by the one or more processors to notify responders of an emergency by automatically sending a push notification to the group of associated MDDs other than the first MDD. The push notification may contain the timestamped log entry of the report.

The plurality of instructions is additionally executable by the one or more processors to notify responders of an emergency by receiving additional information regarding the incident in progress from a second MDD of the group of associated MDDs. The second MDD may be different from the first MDD. The plurality of instructions is further executable by the one or more processors to notify responders of an emergency by automatically recording a timestamped log entry of the additional information. The plurality of instructions is additionally executable by the one or more processors to release notify responders of an emergency by automatically sending a push notification to the group of associated MDDs other than the second MDD. The push notification may contain the timestamped log entry of the additional information.

Some embodiments provide a computer-implemented method for notifying responders of an emergency. In some embodiments, the method may include receiving, at a network server from a first mobile digital device (MDD) of a group of networked MDDs, a report of an incident in progress. The report may include a visual map selection indicating location of the incident. The method may additionally include automatically recording a timestamped log entry of the report. The method may further include sending, from the network server, a push notification to the group of networked MDDs other than the first MDD. The push notification may contain the timestamped log entry of the report.

The method may additionally include receiving, at a network server from a second MDD of the group of networked MDDs, additional information regarding the incident in progress. The second MDD may be different from the first MDD. The method may further include automatically recording a timestamped log entry of the additional information. The method may additionally include automatically sending, from the network server, a push notification to the group of networked MDDs other than the second MDD. The push notification may contain the timestamped log entry of the additional information.

Some embodiments may provide a computer program product for an incident command system. The computer program product may include a non-transitory computer-readable medium having computer-readable program code embodied therewith. The computer readable program code may be configured to receive, at a network server from a first mobile digital device (MDD) of a group of networked MDDs, a report of an incident in progress. The report may include a visual map selection indicating location of the incident. The computer readable program code may additionally be configured to automatically record a timestamped log entry of the report. The computer readable program code may further be configured to automatically send, from the network server, a push notification to the group of networked MDDs other than the first MDD. The push notification may contain the timestamped log entry of the report.

The computer readable program code may additionally be configured to receive, at a network server from a second mobile digital device (MDD) of a group of networked MDDs, additional information regarding the incident in progress. The second MDD may be different from the first MDD. The computer readable program code may further be configured to automatically record a timestamped log entry of the additional information. The computer readable program code may additionally be configured to automatically send a push notification to the group of networked MDDs other than the second MDD. The push notification may contain the timestamped log entry of the additional information.

Features, functions, and advantages may be achieved independently in various embodiments of the present disclosure, or may be combined in yet other embodiments, further details of which can be seen with reference to the following description and drawings.

DETAILED DESCRIPTION

Figure 1:
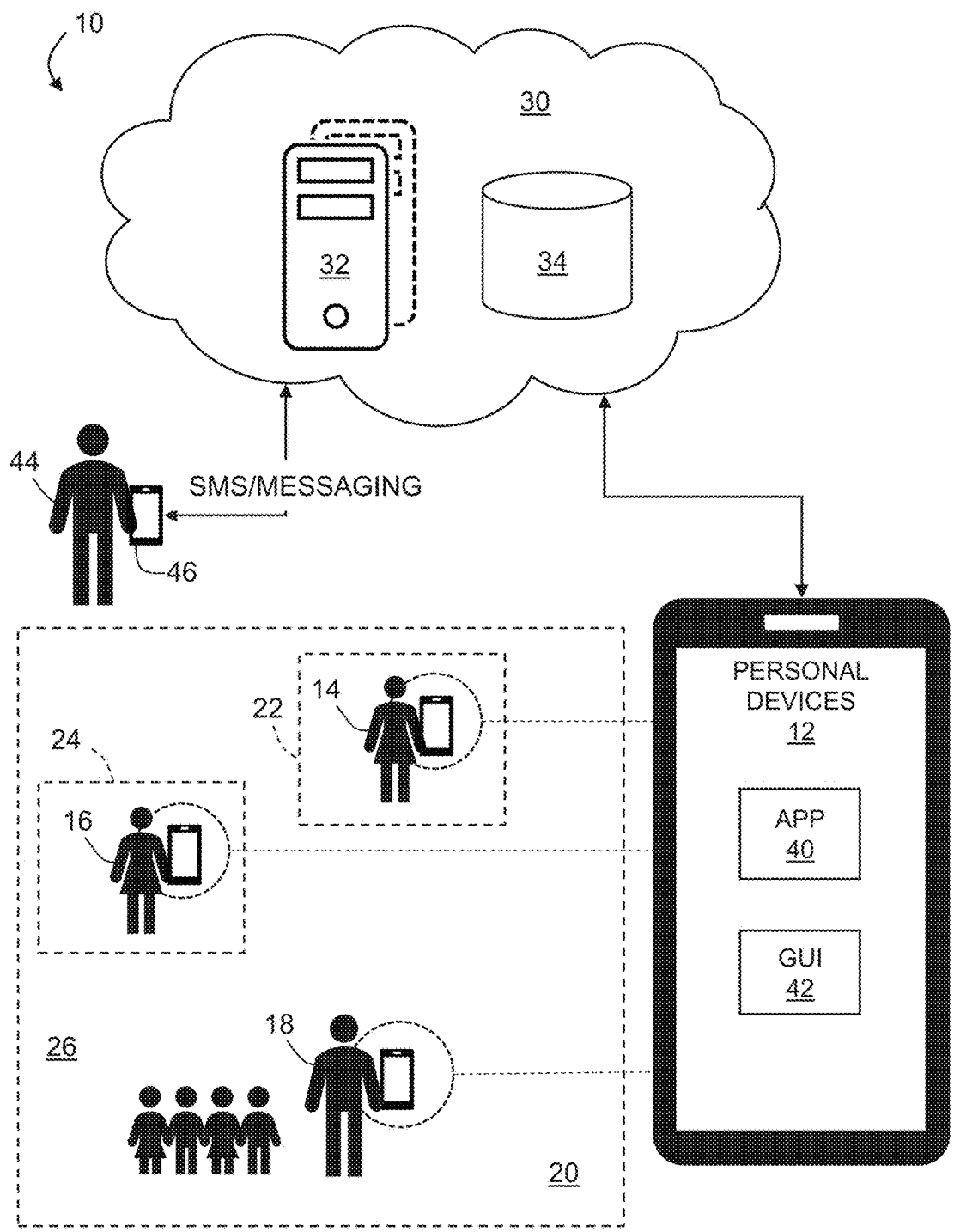
FIG. 1 is a schematic diagram of an illustrative incident command system (ICS) in accordance with aspects of the present disclosure.

Various aspects and examples of an incident command system (ICS) configured to communicate, organize, and document emergency response actions, such as systems that organize and document the release of children to their guardians in the event of an emergency (sometimes referred to as a "student release system"), as well as related methods, are described below and illustrated in the associated drawings. Unless otherwise specified, an ICS of the present teachings, and/or its various components may, but are not required to, contain at least one of the structures, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through H, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Coupled" means connected, either permanently or releasably, whether directly or indirectly through intervening components, and is not necessarily limited to physical connection(s).

Overview

In general, an incident command system (ICS) of the present disclosure may include a network-connected ICS application running on multiple mobile digital devices (MDDs). Each MDD (e.g., smart phone) is in the possession of a different agent of an institution or venue where an incident is either in process or just completed. In the examples described herein, each of the agents has a role in carrying out predefined incident procedures, such as evacuation of schoolchildren or other individuals who require a chaperone or guardian to be present before being released. Generally, the individuals being evacuated will be referred to as students or children and their guardians will be referred to as parents or adults, although other labels and roles are anticipated and within the scope of the present disclosure. The evacuation and/or reunification procedures may be facilitated and automatically documented by the ICS application running on the agents' devices.

More specifically, the ICS application (also referred to as an app) includes functionality that enables reporting of an incident or emergency, allows agents to report in for various preassigned roles, facilitates messaging and alerts between agents, keeps track of each student's status, and tells the agents who is authorized to pick up each of the students. Each step of the reunification/evacuation process is documented and timestamped for each student. In some examples, government and/or other forms may be automatically filled out as events unfold. In some examples, additional materials, such as training videos, instructions, and diagrams may be available via the ICS app.

As described further below, a reunification process may include establishing at least three zones or areas: an arrival zone, a reunification or exit zone, and one or more holding zones. Each of these zones is staffed by at least one agent, who is also in possession of an MDD running the ICS app. The agent at the arrival zone meets and vets parents arriving to pick up their student(s). The agent at the exit zone ensures an outbound student is paired up with the authorized parent. Finally, the agent(s) at the holding zone(s) are in charge of supervising the unreleased groups of students and directing them to the exit zone as they are released to their parents. The ICS app allows this process to be orchestrated and documented seamlessly and efficiently, by automatically providing information on the status of each student, which adults are authorized to pick each student up, and automatically communicating each step to the next agent in the process. For example, releasing a student may include (a) indicating, via the app, that parent A1 has arrived for student A2; (b) communicating, via the app, that student A2 has been released to the exit zone; and (c) communicating, via the app, that student A2 has been reunited with parent A1. These and other steps are timestamped and documented as they occur.

Aspects of the ICS described herein may be embodied as a computer method, computer system, or computer program product. Accordingly, aspects of the ICS may take the form of an entirely hardware embodiment, an entirely software embodiment (including firmware, resident software, microcode, and the like), or an embodiment combining software and hardware aspects, all of which may generally be referred to herein as a "circuit," "module," or "system." Furthermore, aspects of the ICS may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable non-transitory, tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the ICS may be written in one or any combination of programming languages, including an object-oriented programming language such as Java, Smalltalk, C++, and/or the like, and conventional procedural programming languages, such as C. Mobile apps may be developed using any suitable language, including those previously mentioned, as well as Objective-C, Swift, C#, HTML5, and the like. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the ICS are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block(s).

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block(s).

Any flowchart and/or block diagram in the drawings is intended to illustrate the architecture, functionality, and/or operation of possible implementations of systems, methods, and computer program products according to aspects of the ICS. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary incident command systems, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative ICS

As shown in FIG. 1, this section describes an illustrative incident command system (ICS) 10, which is an example of the ICS described in the Overview above.

ICS 10 includes a plurality of mobile digital devices (MDDs) 12, each in the possession of a different agent. In this example, these agents comprise a first agent 14, a second agent 16, and a third agent 18. Additional agents may be present, and all such agents are associated with a venue 20, also referred to as an institution or a location. Each agent may be located in the same or different portions of venue 20, such as different offices, classrooms, auditoriums, parking lots, playgrounds, and/or the like, or any combination of these. These are represented in FIG. 1 as portions 22, 24, and 26.

Each MDD 12 is networked with the others via a computer network 30, also referred to as a cloud. Network 30 may include a local network and/or the Internet. Network 30 may include one or more servers 32 and storage devices 34. Networks and their components are described in further detail below, with respect to FIG. 12.

Each MDD further includes an ICS application or app 40, running on the device, and a graphical user interface (GUI) 42, which may include touch controls. App 40 may run entirely on MDD 12 or may run partially on MDD 12 and partially on servers 32 and partially on MDD 12. Data used by MDD 12 may be stored on MDD 12 and/or on storage devices 34 and/or on servers 32.

App 40 includes a variety of features and functions configured to facilitate incident management and emergency command and control functions. For example, app 40 includes a student tracking feature and a messaging and alert feature, both of which are utilized in a student release process (described below).

Figure 8:
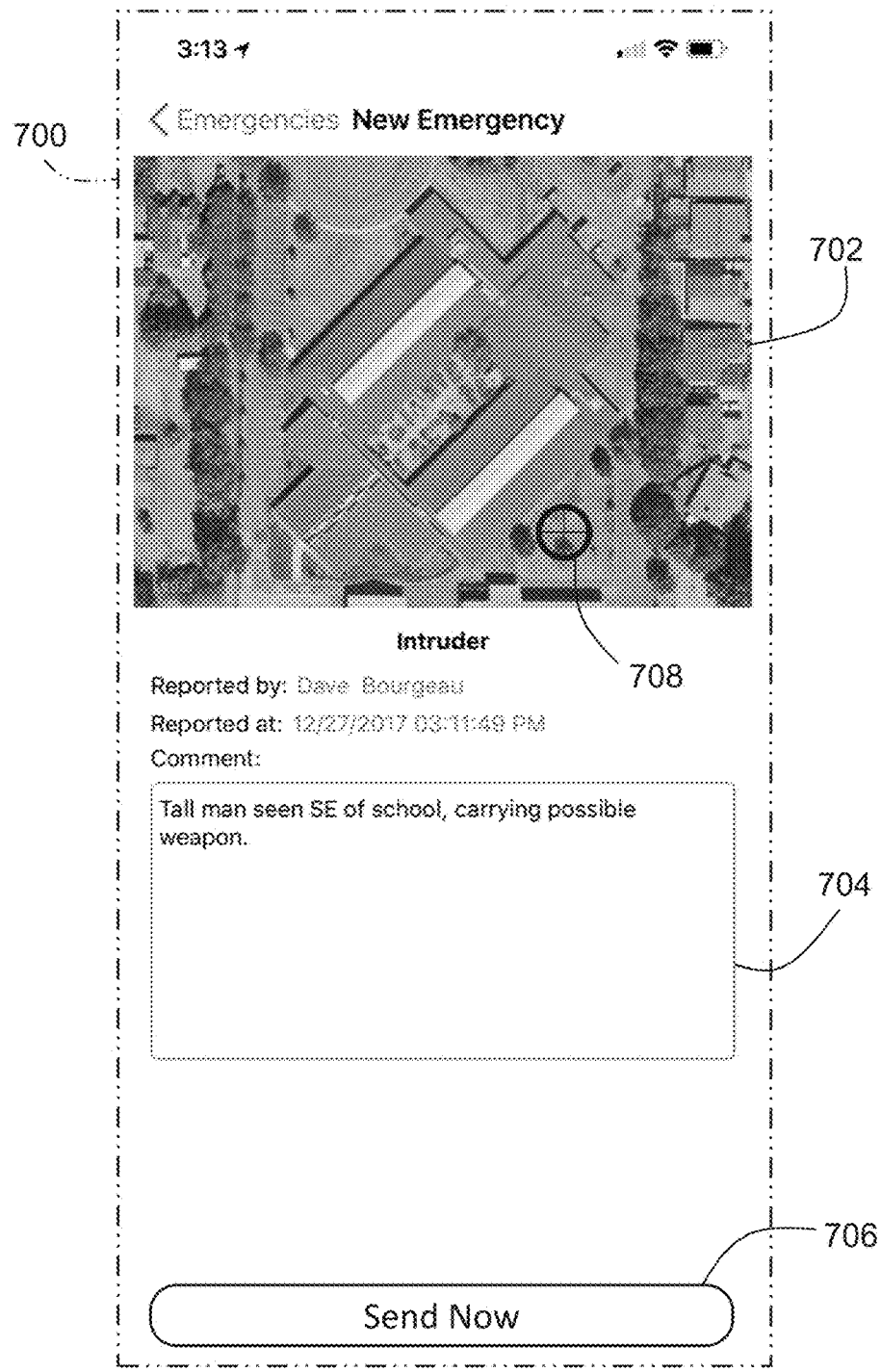
FIG. 8 depicts an illustrative graphical user interface (GUI) displayed by an ICS application running on a mobile digital device, the GUI being configured to facilitate reporting of an incident by a user.

Additionally, ICS app 40 includes an emergency or incident reporting function. Using this function, any agent can report an incident, include details and a graphical map of the location, and automatically ensure a push notification is sent to all user agents. An example of a graphical user interface (GUI) 700 for reporting an incident is depicted in FIG. 8. GUI 700 includes an interactive map 702, a text box 704 for adding details, and a "report" or "send now" button 706. Button 706 may include any suitable interface element for triggering push notifications on MDDs that are logged into the same venue 20.

As described further below, with respect to FIG. 3, the agent reporting the incident can position the aerial-view map within the window of the GUI and may also position a cursor or target 708 to further indicate a specific location of the incident within the selected map area. In some examples, the map is positionable within the window. In some examples, the target is positionable within the window. In some examples, the map auto-zooms to the user's location upon opening, e.g., based on the MDDs known geolocation. In some examples, different cursor(s) or target(s) are used to indicate the location of the reported incident(s), the location of the reporting party (or agent reporting the incident) based on the reporting party's MDD known geolocation and/or the location of one or more responding parties based on the MDDs known geolocation of those parties.

ICS app 40 may further include information relating to emergency procedures, incident response templates, first aid, training materials, and/or the like. In some examples, ICS app 40 includes an automatically populated document for recording milestones or events during the incident. This document may be a government form, such as the Federal Emergency Management Agency's ICS Form 214 (Activity Log), or any other suitable form.

ICS 10 may also be in communication with one or more parents 44. For example, system 10 may send SMS (short message service) or other messages to parent 44 via an MDD 46 possessed by the parent. For example, a text message may be sent to all parents notifying them that their children need to be picked up. This initial message may be sent by the venue using any suitable system and may not include ICS 10. After a student has been retrieved by an authorized adult, all other authorized adults associated with that student may be automatically notified of that fact (via SMS or other messaging system), to prevent unnecessary trips and reduce confusion and congestion at the venue. In some examples, the SMS or other messages may be initiated by ICS 10, and executed by one or more third party services, such that SMS functionality need not be built into ICS 10 or ICS app 40.

Server(s) 32 may be located at venue 20, may be virtual or cloud-based server(s), i.e., located offsite, or may be a combination of onsite and offsite. A computer program or application implemented on the server(s) may receive information from one or more databases, accounting systems, or student information systems. For example, the server(s) may receive information relating to the students who are enrolled at the school, information relating to the students who have been recorded as attending the school on any particular day, information relating to lists of adults who are authorized or approved to retrieve students from the school, etc. Such information may be provided to server(s) 32 and/or storage devices 34, for example, every morning that school is in session. Examples of such databases or student information systems include, but are not limited to, PowerSchool or Aeries® Student Information System.

The ICS app may be in communication with the one or more computer programs or applications implemented on server(s) 32. That is, each of the MDDs and server(s) may send and receive information or data to any of the other MDDs and server(s) via ICS 10. Examples of transmitted information or data include, but are not limited to, information relating to an adult who has arrived at the school to retrieve a student, information relating to the student to be retrieved, instructions to staff members to have the student move from one location to another, acknowledgment of receipt of those instructions, and information relating to the verified reunification of the student and the adult. System 10 may record and store a timestamp relating to the data associated with any or all of the transmissions of information via system 10. These records can later be used for auditing purposes.

B. Illustrative Implementation

Figure 2:
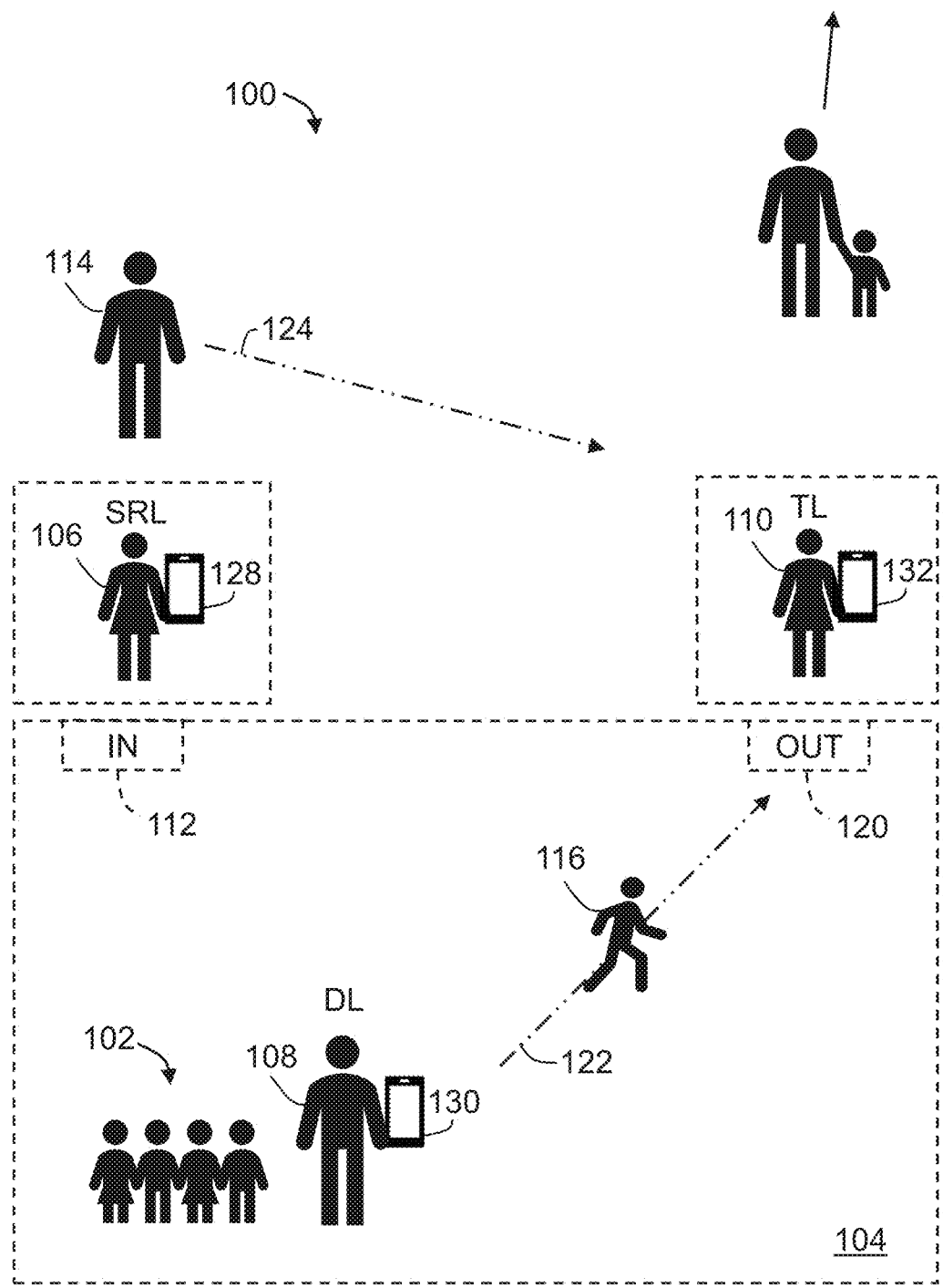
FIG. 2 is a schematic diagram of an illustrative implementation of a child release system for organizing and documenting release of children from a school to a set of approved adults in the event of an emergency, using the ICS of FIG. 1.

As shown in FIG. 2, this section describes an illustrative implementation of a child release system 100 using ICS 10, described above. This example will be described in relation to a group of children being released from a school during or after an incident. However, it will be appreciated that this system could be used in a variety of contexts where children and/or dependent adults (e.g., seniors, disabled persons, etc.) have been left in the care of one or more providers and need to be reunited with their parent, guardian, or other responsible person in an organized and documented manner.

FIG. 2 is a schematic diagram depicting an illustrative child release system, generally indicated at 100. In this example, a plurality of children 102 are waiting at a venue 104, e.g. a school, childcare facility, church, community center, hospital, or the like, to be reunited with their parent(s) or guardian(s). The children may be located inside a shelter (e.g., a building) or at a location outside, such as a playground. There may be one or more representatives or agents (e.g., employees) of the venue. In the case of a school, there may be one or more teachers, administrators, or support staff present. In the event of an emergency, one or more first agents may be designated as a student release leader (SRL) 106, one or more second agents may be designated as a division leader (DL) 108, and one or more third agents may be designated as a transportation leader (TL) 110. The terms SRL, DL, and TL are descriptive and useful. However, any suitable terms or labels may be used to describe these three roles.

During use of child release system 100, SRL 106 may be positioned or located proximate an "in" gate or arrival point 112. Arrival point 112 includes the location to which parents or guardians of children 102 are directed to approach for the purpose of retrieving their children. For example, arrival point 112 may be a gate, a front door, or the like. Upon the arrival of an adult 114 at the arrival point, SRL 106 uses ICS 10 to record the arrival of the adult and to verify that the adult is approved to retrieve a selected child 116 (or children) from venue 104.

During use of the child release system 100, DL 108 may be positioned or collocated with children 102 at a holding area 118. Holding area 118 may be, for example, a room of school 102, or an outside area such as a playground. It may be advantageous to keep the children at a location separate from arrival point 112 and separate from an exit point in order to improve safety and avoid confusion.

In some examples, child release system 100 may include more than one division leader, with each division leader stationed at a different respective holding area 118. For example, each teacher of a class of children may serve as a division leader for the children in their particular class, and their classroom may serve as their designated holding area. ICS 10 and system 100 may be configured to include stored information regarding which children should be located at each holding area, and/or the division leader assigned to each holding area.

Upon arrival of adult 114 at arrival point 112, SRL 106 uses ICS 10 to verify that adult 114 is authorized to pick up child 116, and to send a request to DL 108 directing the DL to send child 116 to an exit gate or reunification point 120. The DL then sends child 116 along a path 122 to the exit gate where the child will be reunited with adult 114. After recording the arrival of the adult and sending the request to the DL, SRL 106 directs adult 114 to proceed to reunification point 120 along a path 124, to meet and retrieve child 116. DL 108 may use ICS 10 to send a message to TL 110 that child 116 is en route to the reunification point. In some examples, this message is automatically generated and/or comprises a status update associated with the child. In examples where there are multiple holding areas, system 100 may send a message only to the particular DL at the holding area where the requested child is located and not to other DLs at other holding areas.

During use of child release system 100, TL 110 may be positioned or located proximate reunification point 120. TL 110 may note the successful reunification of child 116 and adult 114, using ICS 10 to record the successful reunification. It may be advantageous to have the arrival point 112 separate from the exit gate 120, for example, to avoid confusion.

Each of the agents (e.g., SRL 106, DL 108, TL 110) has a mobile digital device (e.g., a smart phone or tablet) configured to execute ICS 10 using a designated application (or app), as described above. Specifically, as depicted in FIG. 2, mobile digital devices 128, 130, and 132 are in the possession of the respective agents and in communication with a common network (e.g., the cloud). Devices 128, 130, and 132 are examples of personal devices 12, described above with respect to ICS 10. These devices may be personal devices of the respective staff members, such as the staff members' phones, or may be school-owned devices assigned to the respective staff members.

In some examples, the agent who will be the student release leader 106 may have been assigned the SRL role prior to an emergency event, for example during a training program. In some examples, during an emergency, an agent may access the app on his or her mobile digital device and self-designate as the SRL. ICS 10 may include a list of staff members who are trained and approved for the various roles of SRL, DL, TL, and others.

When an incident is reported, SRL 106 may proceed to arrival point 112 to await the arrival of parents and guardians. In some examples, the apps on the devices associated with SRL 106 (and other agents with other roles) may automatically receive a list of children who are currently present at school 104 (see FIG. 9). In some examples, SRL 106 may use his or her mobile digital device to send a request for the list of currently attending children to server(s) 126. SRL 106 may also acquire a list of approved adults for each child from the server(s), either automatically, by request, or otherwise (see FIG. 10).

Similarly, other staff members may be automatically designated by system 100 as a division leader or transportation leader or may self-designate as DL 108 and TL 110. Once the staff members, along with their respective mobile digital devices, have been assigned to their respective roles, the SRL DL, and TL may communicate with one another through ICS 10 without needing to know who is actually serving in those roles or what their phone numbers are. For example, SRL 106 may use system 100 to request that student Elijah Aguilar be sent by DL 108 from holding area 118 to exit gate 120 without knowing the identity or contact information of the agent who is serving as the division leader. ICS 10 may also automatically record and store the time at which such a request was made by the SRL.

Any or all communications between SRL 106, DL 108, and TL 110 may go through the network server(s). For example, a request made by SRL 106 to DL 108 to send a child to exit gate 120 may include data sent between the SRL's mobile device 128 and the server(s) as well as data sent between the server(s) and the DL's mobile device 130. In another example, sending a notification from the DL to the TL that the child is on their way to the exit gate may include sending data between DL's mobile device 130 and the server(s) and sending data between the server(s) and TL's mobile device 132. Such an implementation of ICS 10 allows a computer program running on the server(s) to time stamp any communication between the agents.

C. Illustrative ICS Method

Figure 3:
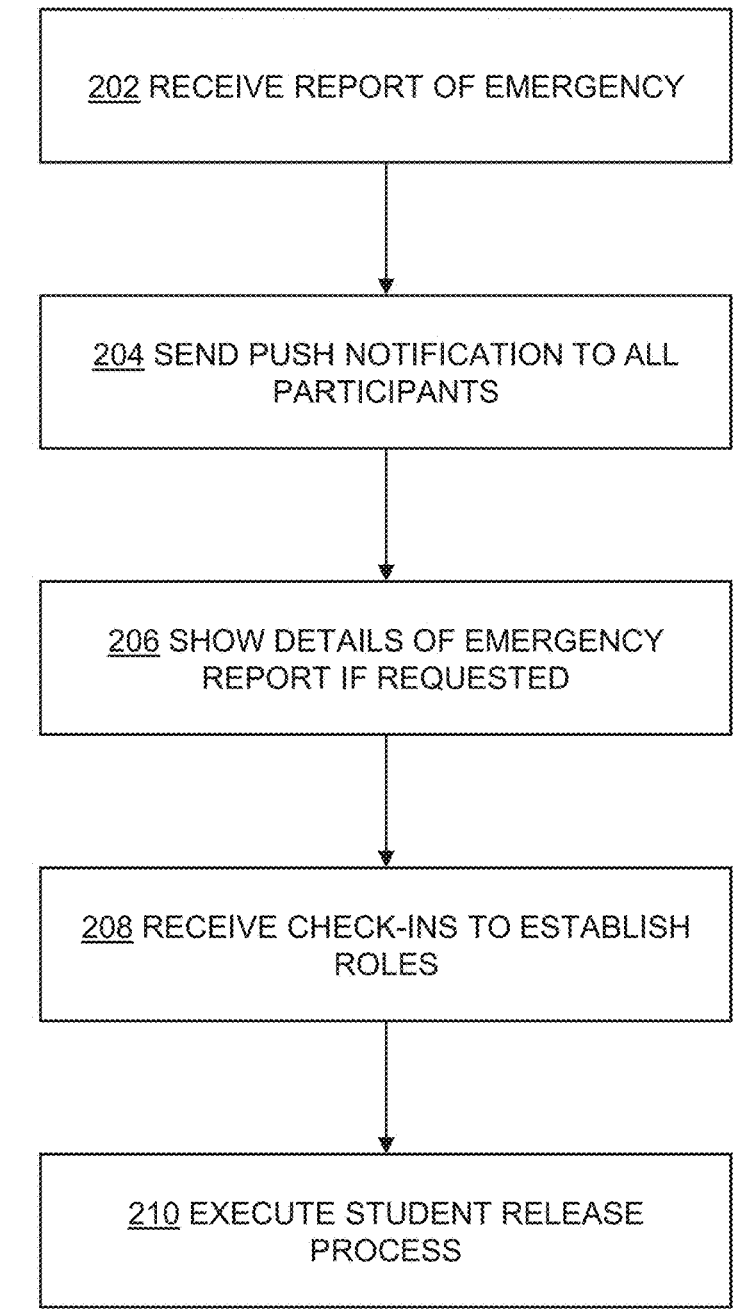
FIG. 3 is a flow chart depicting steps of an illustrative method of using the ICS of FIG. 1.

This section describes steps of an illustrative method 200 for facilitating command of an incident scene using an incident command system, e.g., system 10; see FIG. 3. Aspects of ICS 10 may be utilized in the method steps described below. Where appropriate, reference may be made to components and systems that may be used in carrying out each step. These references are for illustration and are not intended to limit the possible ways of carrying out any particular step of the method.

FIG. 3 is a flowchart illustrating steps performed in an illustrative method and may not recite the complete process or all steps of the method. Although various steps of method 200 are described below and depicted in FIG. 3, the steps need not necessarily all be performed, and in some cases may be performed simultaneously or in a different order than the order shown.

Figure 13:
FIGS. 13-14 depict an illustrative graphical user interface (GUI) displayed by an ICS application running on a mobile digital device, the GUI being configured to facilitate reporting of an incident by a user.
Figure 14:
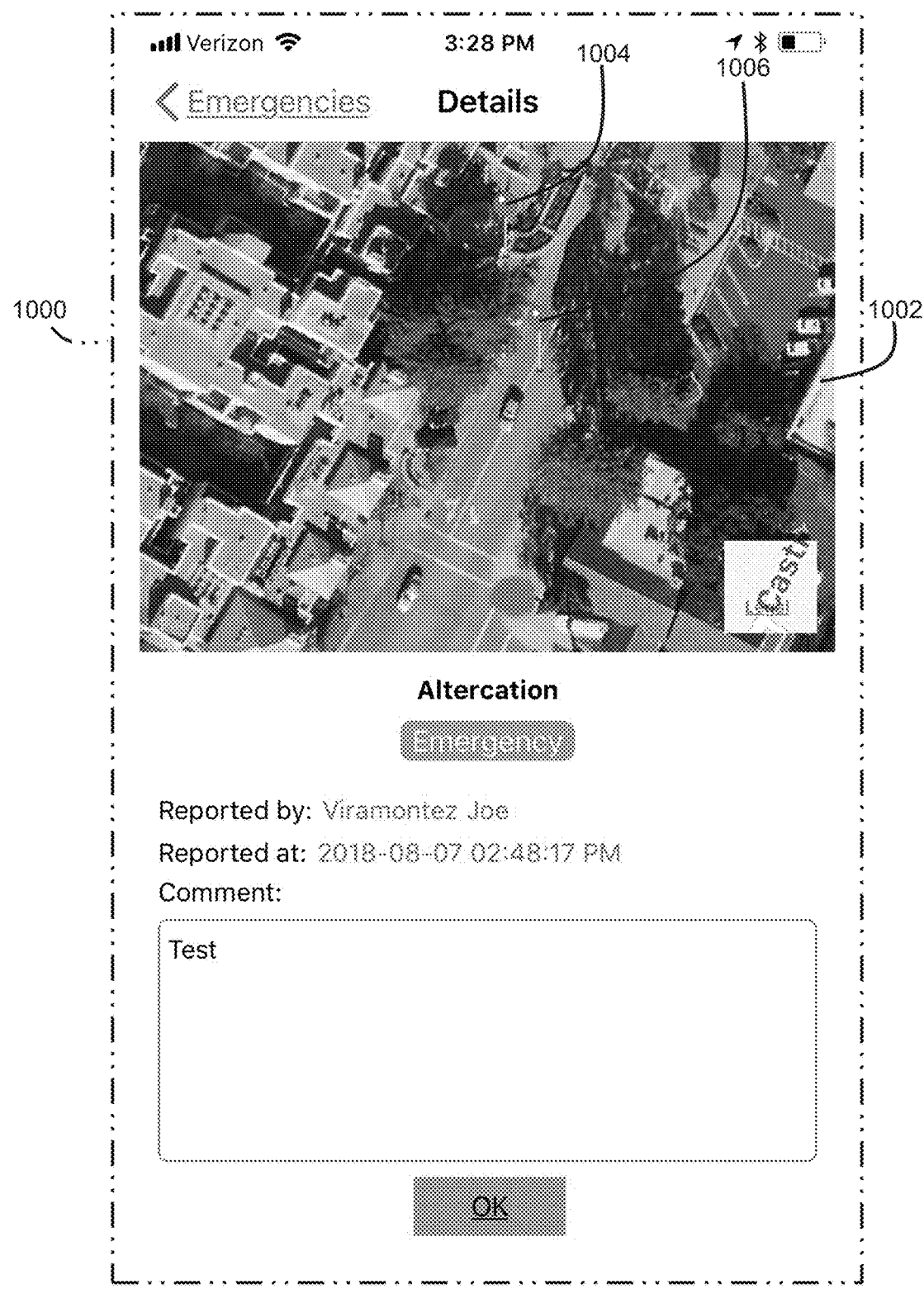

At step 202 of method 200, ICS 10 receives a report of an incident or emergency. This step may be initiated by any agent having ICS app 40 on his or her MDD 12. As described above, and with reference to FIG. 3, GUI 700 may be displayed by ICS app 40 on MDD 12, e.g., in response to a user's selection of a "report incident" button, or the like. Initially, GUI 700 may automatically zoom to a view of the agent's general area, based on the MDD's global positioning system (GPS) coordinates. Map 702 can then be manipulated by the agent to display the actual area of the incident being reported, e.g., by pinching and zooming using a touch-enabled screen. More specifically, in some examples, the agent may also position incident cursor or incident target 708 over the displayed map, corresponding to a more precise location of the incident. In some examples, the location of the reporting agent and/or one or more responding parties also may be indicated via one or more cursors and/or targets, as shown in FIGS. 13-14. For example, reporting agent is displayed in map 1002 of GUI 1000 of FIG. 13 as dot 1004 and the incident location is displayed in map 1002 as dot 1006. Dot 1004 may move if or when the reporting agent moves his or her location. Additionally, a responding party may be displayed in map 1002 of GUI 1000 as dot 1006, as shown in FIG. 14. Dot 1006 may move as the responding party approaches the incident location and/or the reporting agent's location, which allows the responding party to confirm that he or she is moving toward one or more of those locations.

Although incident target 708 is shown as a reticle in FIG. 8, and the locations of the reporting agent, incident location, and responding party are shown as different colored dots in FIGS. 13-14, any suitable cursor or icon (of any suitable pattern and/or color) may be used, such as a plus sign, an "x," a box, or the like. The reporting agent and time of report may be automatically populated, and a text box may be provided for entering comments and further details about the incident. After completing as much of the form as desired, the agent may press, tap, or click button 706 to report the incident to system 10 using ICS app 40.

At step 204 of method 200, ICS 10 responds to the report of an incident by sending a push notification or other suitable alert to each of the other MDDs 12. For example, each agent may experience a pop-up message and/or alert sound on his or her MDD, indicating that an incident has been reported by the specified agent.

At step 206 of method 200, ICS 10 responds to a request for more details by displaying the information provided at step 202 by the reporting agent, including the map and any comments. The request for more details about the incident may be initiated by any agent, e.g., by tapping on the push alert and/or by selecting a corresponding button or other interface element. A list of such reported incidents may be maintained by the system, and the agent may therefore also need to select the incident in question from that list.

At step 208 of method 200, ICS 10 receives check-ins from various agents and establishes roles of each agent based on those check-ins. For example, first agent 14 may check in via ICS app 40 and indicate that she will act as SRL 106 for this incident. Other agents may check in and indicate other roles, per a predetermined protocol. Based on the established roles, each agent will then proceed to their assigned post (e.g., SRL 106 would proceed to arrival point 112).

At step 210 of method 200, ICS 10 responds to user interactions with ICS app 40 to carry out the student release processes described below, with respect to methods 300, 400, 500, and 600.

D. Illustrative Child Release Method

Figure 4:
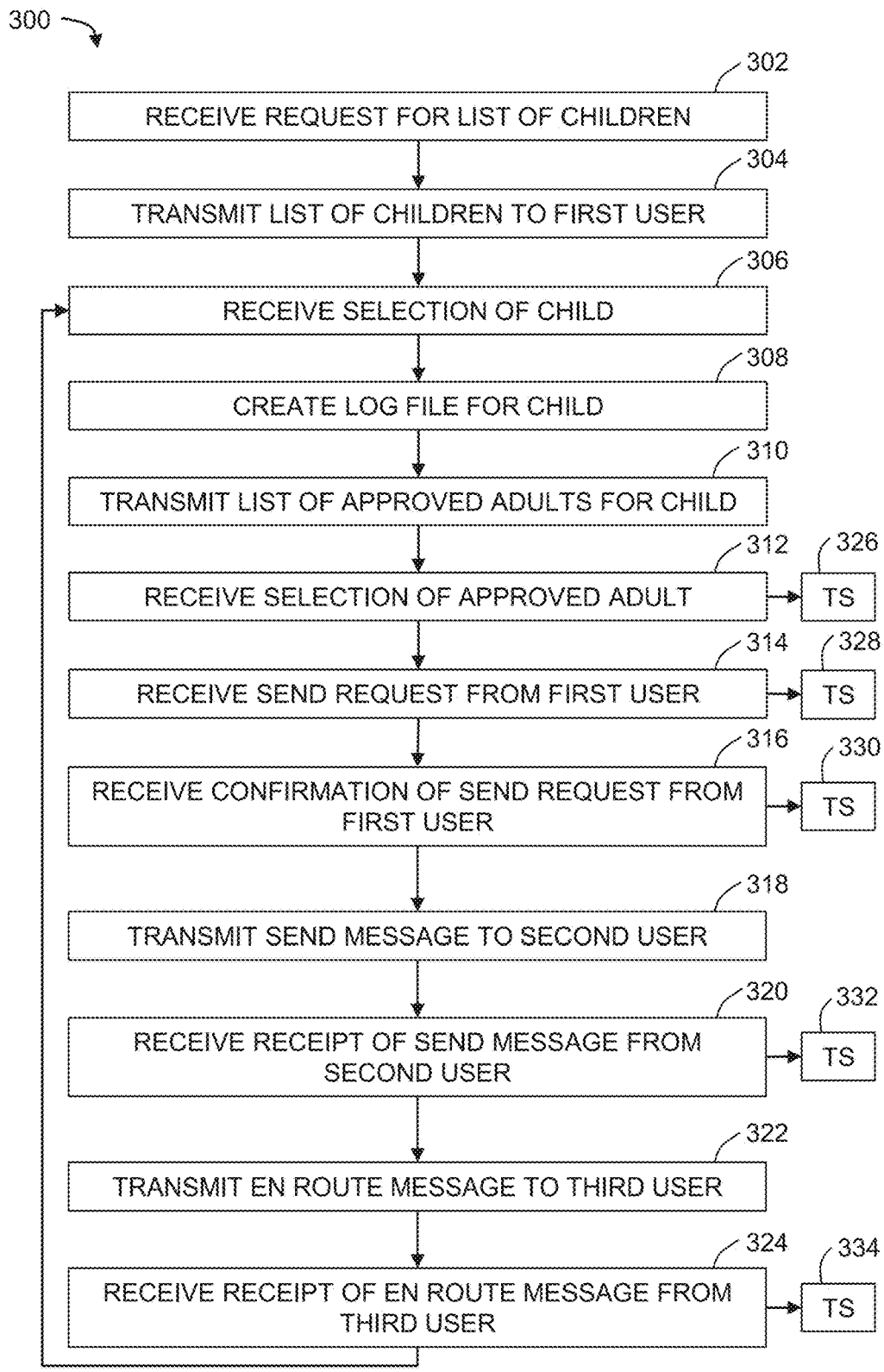
FIG. 4 is a flow chart depicting steps of an illustrative method for organizing and documenting release of children using the ICS of FIG. 1.

This section describes a method 300 for organizing and documenting the release of students or other children from a controlled location; see FIG. 4. Aspects of child release systems, data processing systems, and/or computer network systems may be utilized in the method steps described below. Where appropriate, reference may be made to components and systems described herein that may be used in carrying out each step. These references are for illustration and are not intended to limit the possible ways of carrying out any particular step of the method.

FIG. 4 is a flowchart illustrating steps performed in an illustrative method and may not recite the complete process or all steps of the method. Although various steps of method 300 are described below and depicted in FIG. 4, the steps need not necessarily all be performed, and in some cases may be performed simultaneously or in a different order than the order shown.

The following steps are configured to be performed, at least in part, by a data processing system and/or a computer network (see FIGS. 11 and 12, and detailed descriptions below). Accordingly, they may be interpreted as programmed instructions to be executed by one or more processors. Data being operated on may be disposed at a local or remote data store. Method 300 may be performed by a data processing system of the one or more server(s) 32.

Method 300 is an illustrative embodiment of step 210 of method 200, described above. Step 302 of method 300 includes receiving a request for access to a list of children (e.g., students). The request may come from a first user of a child release system. At step 304, the list of children is transmitted to the first user. In some examples, step 302 may be omitted and the list of children may be transmitted to the first user without the first user making a request for the list. Method 300 may also include a step of receiving the identity (name, ID number, etc.) of the first user as a Student Release Leader (SRL).

Transmitting data or information to a user may include transmitting data or information to a data processing system and/or a computing device (e.g., mobile digital device) associated with a user. Additionally, receiving data or information from a user may include reception of data or information from a data processing system and/or a computing device associated with the user, e.g., via a graphical user interface of the computing device.

Figure 9:
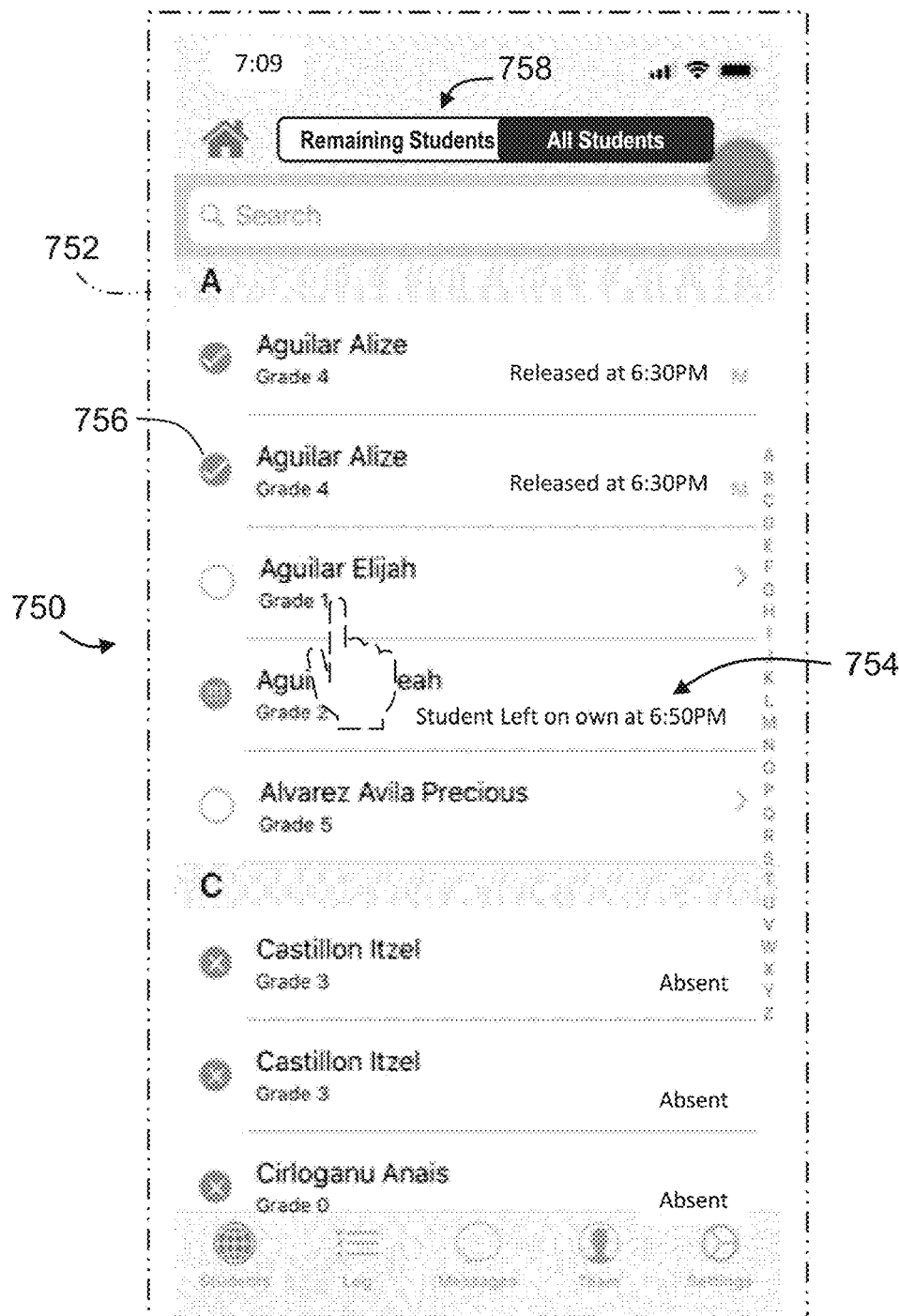
FIG. 9 depicts another illustrative GUI displayed by the ICS application, the GUI being configured to display information regarding selected students during an incident.

An example of a list of students that may be received by the app and displayed to the user is depicted in FIG. 9. A plurality of names of students 750 is shown via a graphical user interface (GUI) 752, e.g., by way of a display of the user's mobile digital device. Each student name may have relevant information displayed in a manner that associates the information with that student. For example, each student name may have an adjacent note 754 (e.g., "Absent" or "Released at 6:30 PM"), indicating details about the status of the student. In another example, each student name may have an associated icon 756 that visually indicates the general status of the student, e.g., a checkmark to indicate the student was released, or an "X" indicating the student is known to be absent. Any suitable indicia and/or textual information may be included. In some examples, one or more filters may be available to the user. For example, a selector 758 may be present that allows the user to toggle between a view of all students and their respective dispositions and a view of only the remaining students (e.g., those not absent and not released).

Step 306 of method 300 includes receiving a selection of a child (e.g., a student). The selection of the child may be made by the first user (e.g., via touch-enabled GUI 752 by tapping on a selected one of the names 750, as indicated in FIG. 9). Upon completion of step 306, method 300 may proceed automatically to a step 308 of creating a log file associated with the child. The log file associated with the child may ultimately include a record of events and corresponding times associated with retrieval of the child from the school by a responsible adult.

Step 310 of method 300 includes transmitting a list of approved adults associated with the child to the first user. The list of approved adults may include one or more parents of the children or any other guardians or other adults who have been previously authorized as able to retrieve the child from the school. In some examples, step 310 may be performed in response to the reception of the selection of the child in step 306. In some examples, step 310 may be performed prior to the selection of a child, for example along with step 304 of transmitting the list of children to the first user.

Figure 10:
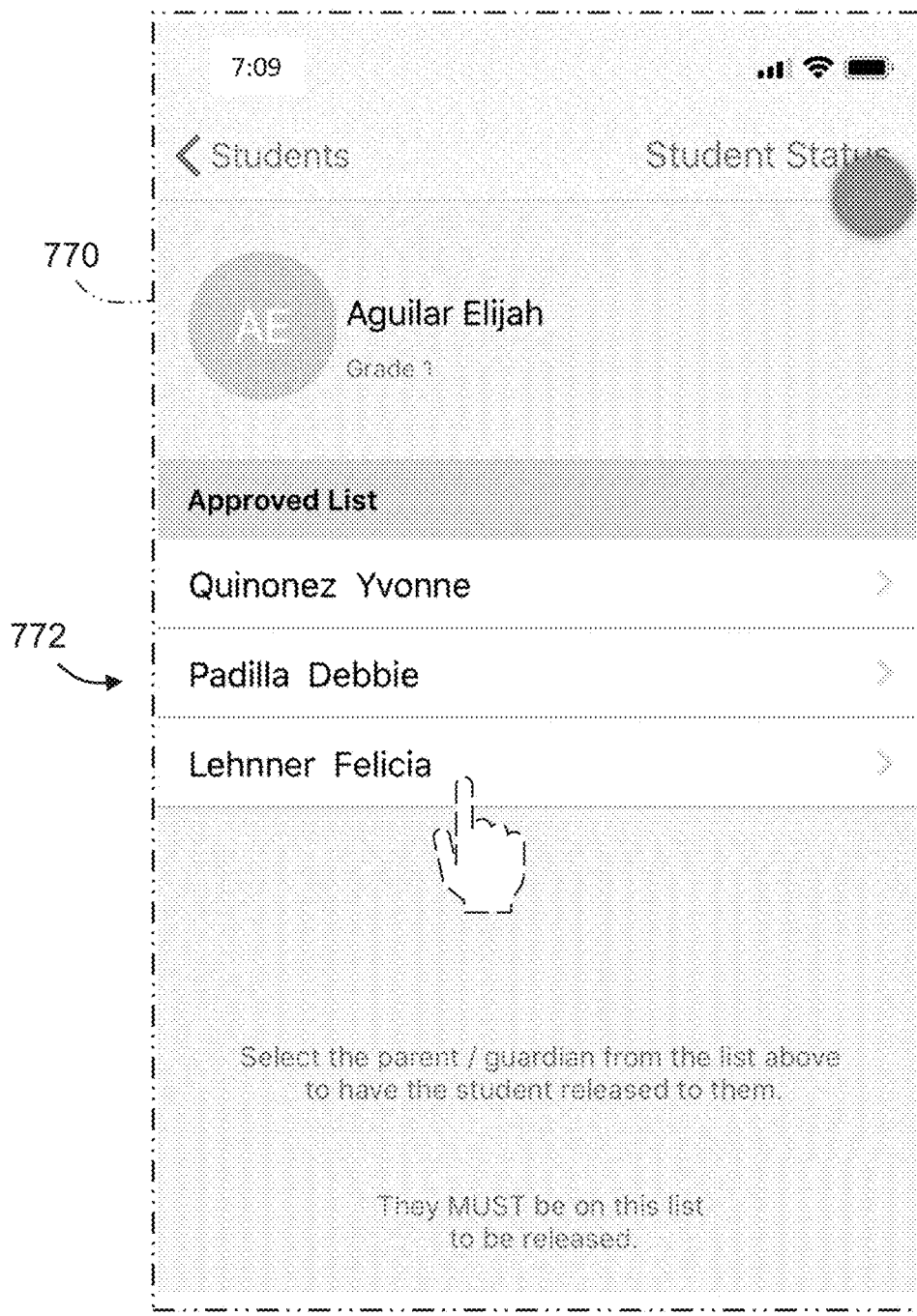
FIG. 10 depicts another illustrative GUI displayed by the ICS application, the GUI being configured to display information regarding authorized guardians associated with a selected one of the students.

An example of a list of approved adults associated with the selected child is depicted in FIG. 10. GUI 770 includes the name of the selected student (here, Elijah Aguilar), and a listing 772 of the names of authorized adults associated with the selected student.

Step 312 of method 300 includes receiving a selection of an approved adult from the list of approved adults. The selection may be made by the first user (e.g., via touch-enabled GUI 770 by tapping on a selected one of the names 772, as indicated in FIG. 10). Step 312 may include recording an identification of the approved adult in the log file associated with child.

Step 314 of method 300 includes receiving a send request from the first user. The send request may be a request to deliver the child to an exit gate (see FIG. 2). The send request may be sent by the SRL in response to an approved adult associated with the child arriving at an arrival point.

Step 316 of method 300 includes receiving a confirmation of the send request from the first user. Method 300 may not proceed from step 314 of receiving the send request to a step 318 of transmitting a send message to a second user until step 316 of receiving a confirmation of the send request is performed. Performing confirmation step 316 in between reception step 314 and transmission step 318 may prevent errors. The send message may direct the second user to send the child to the exit gate. Method 300 may include a step of receiving an identification of the second user as a Division Leader (DL).

Step 320 of method 300 includes receiving a receipt of the send message from the second user. The receipt of the send message may indicate that the second user has sent the child to the exit gate. Method 300 may automatically proceed to a step 322 of transmitting an en route message to a third user. The en route message may indicate to the third user that the child is en route to the exit gate. Method 300 may include a step of receiving an identification of the third user as a Transportation Leader (TL).

Step 324 of method 300 includes receiving a receipt of the en route message from the third user. The receipt of the en route message may indicate that the child has been reunited with the approved adult.

Method 300 may include one or more steps relating to automatically creating a time stamp associated with an event and recording the time stamp in the log file associated with the child. With respect to the example shown in FIG. 4: a first time stamp 326 associated with the receiving of the selection of the approved adult is created and recorded, a second time stamp 328 associated with the receiving of the send request is created and recorded, a third time stamp 330 associated with the receiving of the confirmation of the send request is created and recorded, a fourth time stamp 332 associated with the receipt of the send message is created and recorded, and a fifth time stamp 334 associated with the receipt of the en route message is created and recorded. It will be appreciated that time stamps associated with any of the other steps of method 300 may also be created and recorded in one or more log files.

In some examples, upon completion of step 324, method 300 may return to step 306 for receiving a selection of a second child. Method 300 may then proceed through steps 306 through 334, including creating a log file associated with the second child and recording any relevant information relating to the second child in the log file associated with the second child.

In some examples, method 300 may include more than one parallel instance of steps 306 through 334. That is, method 300 may include a unique performance of steps 306 through 334 for each child. For example, method 300 may include multiple instances of step 306 (receiving a selection of a child) and step 308 (creating a log file associated with the child). Additional instances of steps 306 and 308 may be performed before step 324 and/or step 334 associated with the first child. Each new performance of step 306 may instigate a new branch of method 300 associated with a new child.

In some examples, method 300 may be performed where there is more than one division leader located at more than one respective holding area with more than one respective groups of children. In these examples, step 318 of transmitting a send message to a second user who may be a division leader may include determining which division leader is located proximate the selected child. The information pertaining to which children are located with which division leaders may be received from a database or child information system.

E. Illustrative User-Specific Methods

Figure 5:
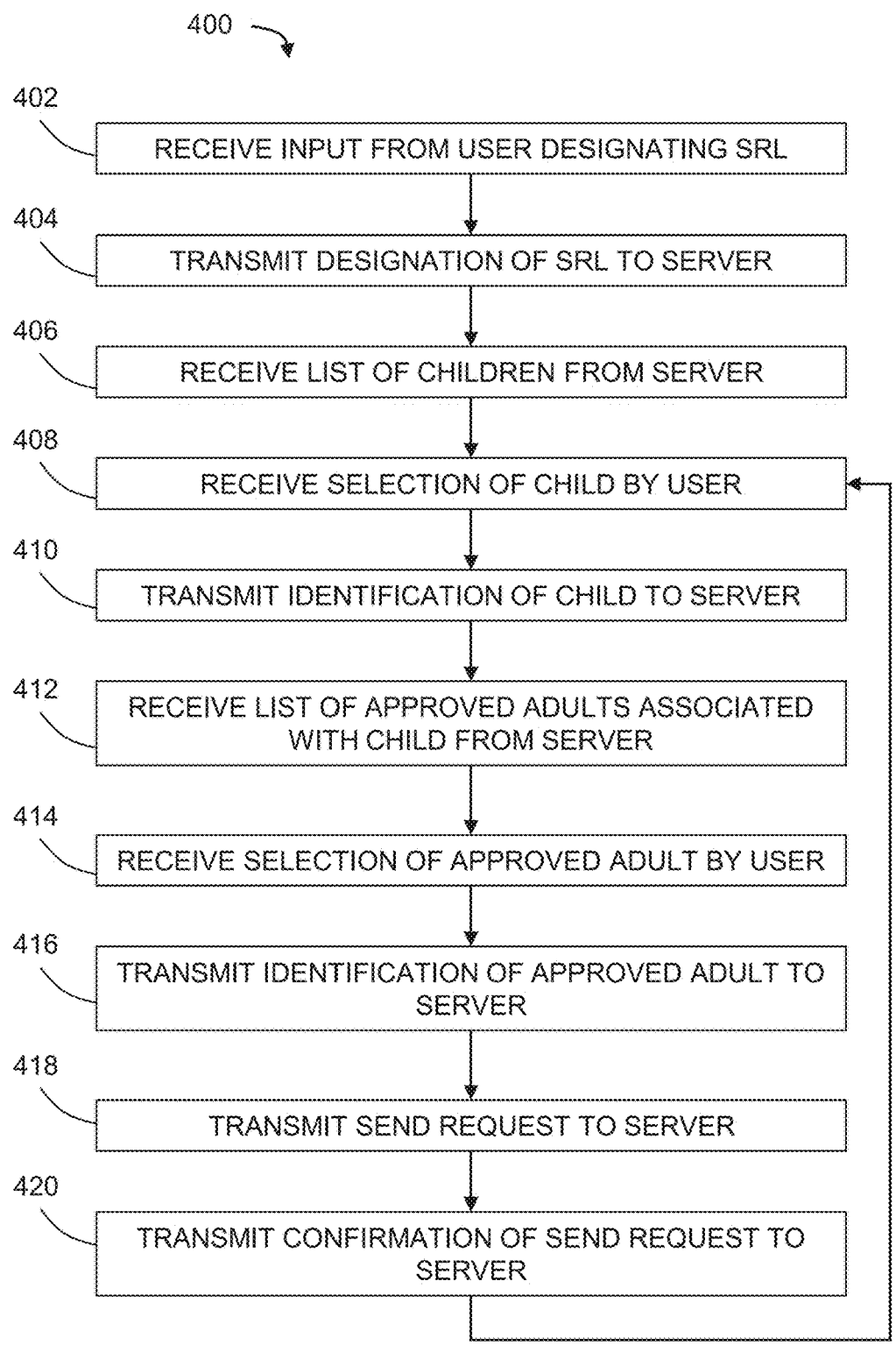
FIG. 5 is a flow chart depicting steps of an illustrative method, associated with a Student Release Leader (SRL), of organizing and documenting release of children.
Figure 6:
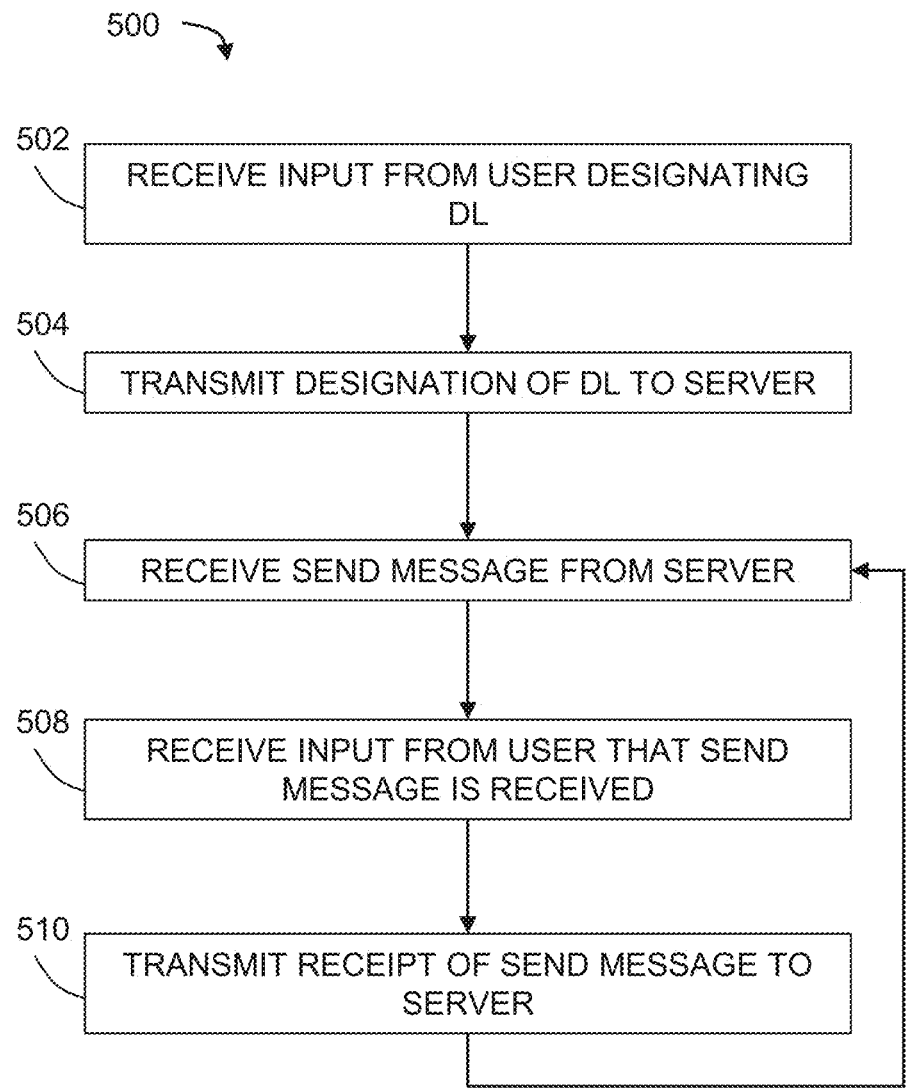
FIG. 6 is a flow chart depicting steps of an illustrative method, associated with a Division Leader (DL), of organizing and documenting release of children.
Figure 7:
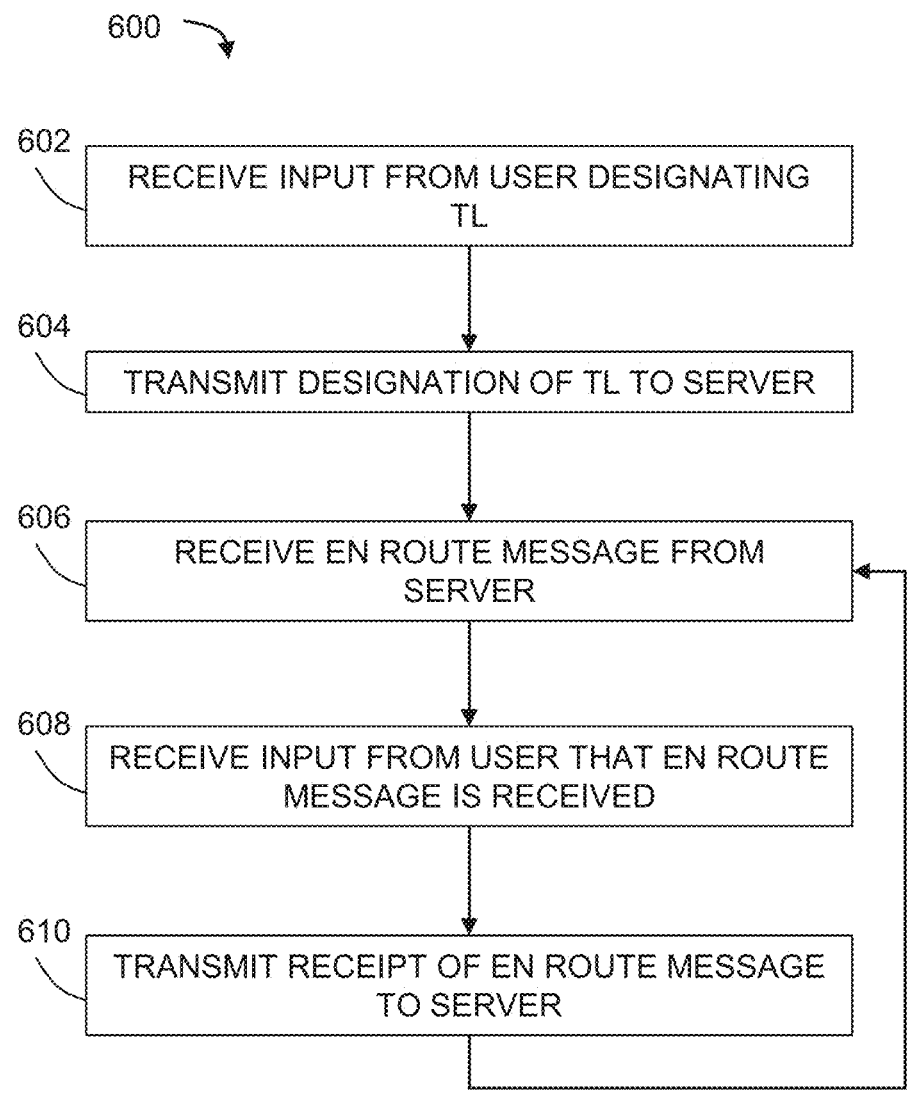
FIG. 7 is a flow chart depicting steps of an illustrative method, associated with a Transportation Leader (TL), of organizing and documenting release of children.

This section describes steps of three illustrative methods (400, 500, 600) for organizing and documenting release of children in an emergency or incident response situation; see FIGS. 5-7. Aspects of systems and methods described above may be utilized in the method steps described below. Where appropriate, reference may be made to components and systems that may be used in carrying out each step. These references are for illustration and are not intended to limit the possible ways of carrying out any particular step of the method.

FIGS. 5-7 are flowcharts illustrating steps performed in illustrative methods and may not recite the complete process or all steps of the method. Although various steps of methods 400, 500, and 600 are described below and depicted in FIGS. 5-7, the steps need not necessarily all be performed, and in some cases may be performed simultaneously or in a different order than the order shown.

The following steps are configured to be performed, at least in part, by a data processing system and/or, at least in part, by a computer network (see FIGS. 11 and 12, and detailed descriptions below). Accordingly, they may be interpreted as programmed instructions to be executed by one or more processors. Data being operated on may be disposed at a local or remote data store.

Specifically, and with reference to FIG. 5, method 400 may be performed by a data processing system of mobile digital device 128 associated with Student Release Leader (SRL) 106. Steps of method 400 that include transmitting data to a server may correspond to steps of method 300 that include receiving data from a first user. Steps of method 400 that include receiving data from a server may correspond to steps of method 300 that include transmitting data to a first user.

Step 402 of method 400 includes receiving input from a user designating the user as a student release leader (SRL). In some examples, the user may select the role of student release leader from a list of possible roles using the ICS app running on a mobile digital device. Method 400 proceeds to step 404 of transmitting the designation of the user as a student release leader to a server.

Step 406 of method 400 includes receiving a list of children from the server. In some examples method 400 may include step 406 but not steps 402 and 404. For example, the user may be automatically designated by the child release system as a student release leader without input from the user. Step 406 may include displaying the list of children to the user on a display of the data processing system.

Step 408 of method 400 includes receiving a selection of a child from the list of children, the selection of the child made by the user. FIG. 9 shows an illustrative display of a portion of the list of children, as described above. The user may select the name of a particular child, for example "Elijah Aguilar," by using a cursor or a finger or stylus on a touch screen of the display. Method 400 proceeds automatically to a step 410 of transmitting an identification of the child to the server.

Step 412 of method 400 includes receiving a list of approved adults associated with the child from the server. In some examples, step 412 may be performed after step 408 of selecting a child. In some examples, step 412 may be performed before step 408 of selecting a child. In these examples, the data processing system which is performing method 400 may receive the lists of approved adults for each child at the same time or nearly at the same time as was the list of children received.

Step 414 of method 400 includes receiving a selection of an approved adult from the list of approved adults. The selection may be made by the user. Step 414 may include displaying the list of approved adults to the user. As described above, FIG. 10 shows an illustrative display of a list of approved adults associated with the selected student, Elijah Aguilar. The user may select the approved adult by using a cursor or a touch screen, for example. The display of approved adults may be presented to the user automatically upon selection of the child at step 408.

Step 416 of method 400 includes transmitting an identification of the approved adult to the server. Upon selection of the approved adult from the list of approved adults, method 400 may include a step of displaying a send request indication to the user. The send request display may include the name of the selected child and a send request button. The user may select the send request button, for example via a touch screen. That is, the data processing system of the mobile computing device may receive input from the user indicating that the user intends to transmit a send request to a division leader.

Step 418 of method 400 includes transmitting the send request to the server. The send request may be a request to deliver the child to the exit gate. Step 418 may proceed following selection of send request button 472 by the student release leader.

Subsequent to selection of the send request button, a confirmation request may be presented to the user on a display of the user's mobile computing device. The confirmation request may include the name of the child and a confirmation button. The user may select the confirmation button, for example via a touch screen. Upon receiving input from the user confirming the intention to send the child to the reunification point, method 400 proceeds to step 420, which includes transmitting a confirmation of the send request to the server.

Upon completion of step 420, method 400 may return to step 408 to receive a selection of a second child from the list of children. Steps 408 through 420 may be performed multiple times as different adults arrive to retrieve their respective children.

Steps 408 through 420 may be performed by a data processing device associated with a student release leader at an arrival point. The SRL may be in charge of receiving the arriving adults and organizing the release of their children. The SRL may accomplish their tasks using a data processing device performing method 400 more quickly than without the aid of a child release system performing method 400. Existing solutions to the problem of receiving adults and organizing the release of their children may include physically writing down the names of the arriving adults, manually checking the names of the arriving adults against a written list of approved adults, calling a division leader on the phone to tell the division leader to release the child, and ensuring that the child and the adult are successfully reunited. This existing solution has multiple opportunities for errors, failed communication, and failed documentation and can take a relatively long amount of time. In contrast, a SRL using a child release system performing method 400 may proceed quickly and automatically from step 408 to step 420, and through displays such as shown in FIGS. 9 and 10, without having to write anything down and with the child release system recording all actions taken and the times at which the actions were taken.

Turning to FIG. 6, method 500 may be performed by a data processing system of mobile digital device 130 associated with Division Leader (DL) 108. Steps of method 500 that include transmitting data to a server may correspond to steps of method 300 that include receiving data from a second user. Steps of method 500 that include receiving data from a server may correspond to steps of method 300 that include transmitting data to a second user.

Step 502 of method 500 includes receiving input from a user designating the user as a division leader (DL). In some examples, the user may select the role of division leader from a list of possible roles using the ICS app, which is implemented in a mobile digital device. Method 500 may proceed to a step 504 of transmitting the designation of the user as a division leader to a server. In some examples, the user may be automatically assigned the role of division leader by a child release system without performing steps 502 and 504.

Step 506 of method 500 includes receiving a send message from the server. The send message may direct the second user to send a child to the exit gate. Upon receipt of the send message, a display of the send message may be presented to the user on a display of the user's mobile digital device. The display of the send message may include the child's name and an indicator or button that the division leader is to send the named child to the reunification site or point.

Step 508 of method 500 includes receiving input from the user that the send message has been received. The input may be received, for example, by the user selecting the indicator or button via a touch screen. That is, by selecting the button, the division leader may be indicating that the division leader has received the message to send the child to the exit gate. A confirmation display may be presented to the division leader upon the division leader's selection of the button.

Step 510 of method 500 includes transmitting a receipt of the send message to the server. Step 510 may be performed automatically after confirmation. The receipt of the send message may indicate that the child is en route to the exit gate. At some point between steps 506 and 510, the division leader may instruct the child to proceed to the exit gate.

Upon completion of step 510, method 500 may return to step 506 to receive a second send message from the server directing the division leader to send a second child to the exit gate. Steps 506 through 510 may be performed multiple times as multiple children are sent to the exit gate.

In some examples, multiple parallel instances of steps 506 through 510 may be performed. For example, the division leader may receive three send messages in rapid succession directing the DL to send three children to the exit gate. These three message may all be presented to the division leader simultaneously. The division leader may find the first child and instruct them to proceed to the exit gate, select the appropriate buttons corresponding to the first child so that the data processing system performs step 508 and 510 relative to the first child. The division leader may then perform these actions relative to the second child and then relative to the third child.

Turning to FIG. 7, method 600 may be performed by a data processing system of the mobile computing device 132 associated with Transportation Leader (TL) 110. Steps of method 600 that include transmitting data to a server may correspond to steps of method 300 that include receiving data from a third user. Steps of method 600 that include receiving data from a server may correspond to steps of method 300 that include transmitting data to a third user.

Step 602 of method 600 includes receiving input from a user designating the user as a transportation leader (TL). In some examples, the user may select the role of transportation leader from a list of possible roles using the ICS app implemented on a mobile digital device. Method 600 proceeds to step 604, which includes transmitting the designation of the user as a transportation leader to a server. In some examples, the user may be automatically assigned the role of transportation leader by a child release system without performing steps 602 and 604.

Step 606 of method 600 includes receiving an en route message from the server. The en route message may indicate to the transportation leader that the child is en route to the exit gate. Upon receipt of the en route message, a display of the en route message may be presented to the user on a display of the user's data processing device. The display of the send message may include a "reunited" button including the child's name and an indication that the child has been reunited with their adult.

Step 608 of method 600 includes receiving input from the user indicating that the "en route" message has been received. The transportation leader may provide this input by selecting the "reunited" button, for example, via a touch screen. Selecting the "reunited" button may indicate that the transportation leader has witnessed the child being reunited with an approved adult. Upon reception of the input from the user, method 600 may proceed automatically to step 610, which includes transmitting a receipt of the en route message to the server. The receipt of the en route message may indicate that the child has been reunited with the approved adult.

In some examples, upon completion of step 610, method 600 may return to step 606 for receiving an "en route" message indicating to the user that a second child is en route to the exit gate. Steps 606 through 610 may be performed multiple times as multiple children are reunited with their respective approved adults.

In some examples, multiple parallel instances of steps 606 through 610 may be performed. For example, a transportation leader may receive three "en route" messages corresponding to three children in rapid succession. These "en route" messages may be displayed as three buttons to the transportation leader. Once the TL has witnessed the first child being reunited with their approved adult, the TL may select the "reunited" button associated with the first child so that steps 608 and 610 may be performed relative to the first child. Similarly, the TL may subsequently select "reunited" buttons associated with the second and third children so that steps 608 and 610 relative to the second and third children may be performed.

The illustrative embodiment of a child release system described above is but one implementation of a child release system capable of organizing and documenting the release of children that is vastly superior to existing solutions. Other features and sources of information could be added to the above system and remain within the intended scope of the present disclosure.

In some examples, the student release leader may use a camera of their mobile computing device to take a picture of the adult or adults who have arrived to retrieve a particular child. This picture could be transmitted, through the server(s) to the transportation leader so that the transportation leader can visually verify that the correct adult has been reunited with their child. This picture could also be recorded in the log file associated with the release of the child for auditing purposes.

In some examples, one or more of the implementations of the child release system on the mobile computing devices associated with the staff members may include options for sending and receiving information and messages to and from an Incident Command System (ICS) Leader. The release of children from the school may be part of a greater response to an emergency event and the release of the children may need to be coordinated with that greater response. For example, if the emergency event is a dangerous weather event, it may not always be safe to release the children from the school due to the weather and/or road conditions. An ICS Leader may be in contact with the student release leader and may inform the SRL when it is appropriate to begin releasing children from the school.

The child release system may be a part of a larger Incident Command System. A user of such an ICS system may select the child release application from a list of options and then select a role within the child release system. In such a system, another user of the ICS system, for example the ICS leader, may contact the student release leader through the application without knowing what specific person was serving that role or what their specific contact information was.

In some examples, a child release system may use and/or record other kinds of information or data. For example, a child release system may use GPS data for identifying the location of various children or staff members, tracking the progress of children from a holding area to an exit gate, etc. Such information may be recorded as part of the log file associated with the release of each child, may be used in the assigning of roles to staff members, and may be used to identify which children are in proximity to which division leaders.

In some examples, information or data from one or more cameras may be utilized by a child release system. Cameras may track movement of children and/or adults and the data from a set of cameras may be used, for example, to let a transportation leader know a child is en route to an exit gate. Data gathered from cameras may also be used to verify the reunification of a child with an adult, with these images being stored in the log file associated with the child.

In some examples, a child release system may include encrypting messages before transmitting the messages to or from the server(s). A verifiable security protocol regarding the sending and receiving of information relating to children may be required by an auditing procedure.

F. Illustrative Data Processing System

Figure 11:
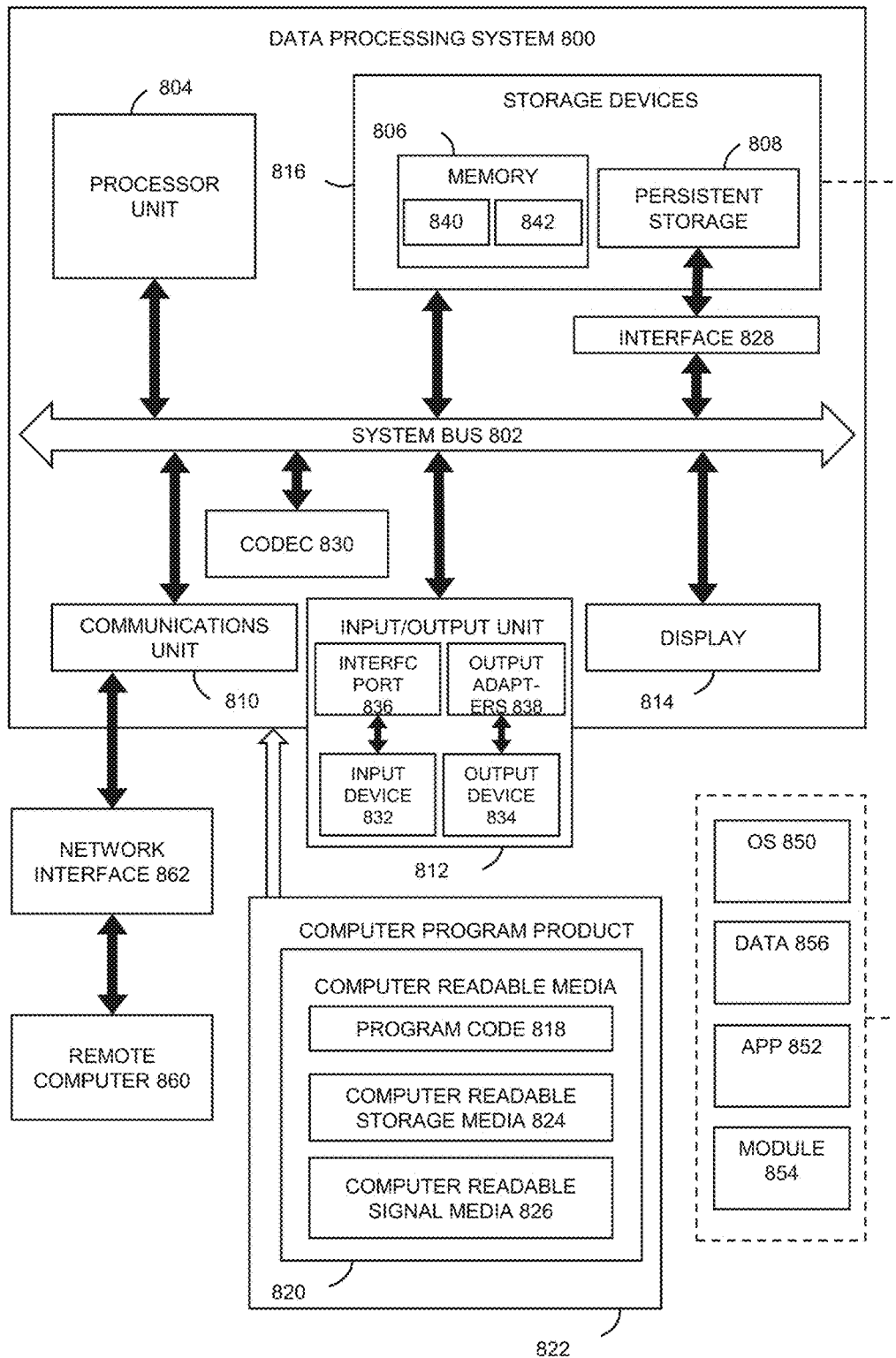
FIG. 11 is a schematic diagram of various components of an illustrative data processing system suitable for use with aspects of the present disclosure.

As shown in FIG. 11, this example describes a data processing system 800 (also referred to as a computer, computing system, and/or computer system) in accordance with aspects of the present disclosure. In this example, data processing system 800 is an illustrative data processing system suitable for implementing aspects of the ICS. More specifically, in some examples, devices that are embodiments of data processing systems (e.g., smartphones, tablets, personal computers) may be used by one or more student release leaders, division leaders, and/or transportation leaders at a school or other incident site. In other words, MDDs 12 may be examples of data processing systems. Further, devices that are embodiments of data processing systems (e.g., smartphones, tablets, personal computers) may be used as one or more server(s) in communication with one or more mobile communication devices.

In this illustrative example, data processing system 800 includes a system bus 802 (also referred to as communications framework). System bus 802 may provide communications between a processor unit 804 (also referred to as a processor or processors), a memory 806, a persistent storage 808, a communications unit 810, an input/output (I/O) unit 812, a codec 830, and/or a display 814. Memory 806, persistent storage 808, communications unit 810, input/output (I/O) unit 812, display 814, and codec 830 are examples of resources that may be accessible by processor unit 804 via system bus 802.

Processor unit 804 serves to run instructions that may be loaded into memory 806. Processor unit 804 may comprise a number of processors, a multi-processor core, and/or a particular type of processor or processors (e.g., a central processing unit (CPU), graphics processing unit (GPU), etc.), depending on the particular implementation. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device may include any suitable hardware capable of storing information (e.g., digital information), such as data, program code in functional form, and/or other suitable information, either on a temporary basis or a permanent basis.

Storage devices 816 also may be referred to as computer-readable storage devices or computer-readable media. Memory 806 may include a volatile storage memory 840 and a non-volatile memory 842. In some examples, a basic input/output system (BIOS), containing the basic routines to transfer information between elements within the data processing system 800, such as during start-up, may be stored in non-volatile memory 842. Persistent storage 808 may take various forms, depending on the particular implementation.

Persistent storage 808 may contain one or more components or devices. For example, persistent storage 808 may include one or more devices such as a magnetic disk drive (also referred to as a hard disk drive or HDD), solid state disk (SSD), floppy disk drive, tape drive, Jaz drive, Zip drive, LS-80 drive, flash memory card, memory stick, and/or the like, or any combination of these. One or more of these devices may be removable and/or portable, e.g., a removable hard drive. Persistent storage 808 may include one or more storage media separately or in combination with other storage media, including an optical disk drive such as a compact disk ROM device (CD-ROM), CD recordable drive (CD-R Drive), CD rewritable drive (CD-RW Drive), and/or a digital versatile disk ROM drive (DVD-ROM). To facilitate connection of the persistent storage devices 808 to system bus 802, a removable or non-removable interface is typically used, such as interface 828.

Input/output (I/O) unit 812 allows for input and output of data with other devices that may be connected to data processing system 800 (i.e., input devices and output devices). For example, input device 832 may include one or more pointing and/or information-input devices such as a keyboard, a mouse, a trackball, stylus, touch pad or touch screen, microphone, joystick, game pad, satellite dish, scanner, TV tuner card, digital camera, digital video camera, web camera, and/or the like. These and other input devices may connect to processor unit 804 through system bus 802 via interface port(s) 836. Interface port(s) 836 may include, for example, a serial port, a parallel port, a game port, and/or a universal serial bus (USB).

Output devices 834 may use some of the same types of ports, and in some cases the same actual ports, as input device(s) 832. For example, a USB port may be used to provide input to data processing system 800 and to output information from data processing system 800 to an output device 834. Output adapter 838 is provided to illustrate that there are some output devices 834 (e.g., monitors, speakers, and printers, among others) which require special adapters. Output adapters 838 may include, e.g. video and sounds cards that provide a means of connection between the output device 834 and system bus 802. Other devices and/or systems of devices may provide both input and output capabilities, such as remote computer(s) 860. Display 814 may include any suitable human-machine interface or other mechanism configured to display information to a user, e.g., a CRT, LED, or LCD monitor or screen, etc.

Communications unit 810 refers to any suitable hardware and/or software employed to provide for communications with other data processing systems or devices. While communication unit 810 is shown inside data processing system 800, it may in some examples be at least partially external to data processing system 800. Communications unit 810 may include internal and external technologies, e.g., modems (including regular telephone grade modems, cable modems, and DSL modems), ISDN adapters, and/or wired and wireless Ethernet cards, hubs, routers, etc. Data processing system 800 may operate in a networked environment, using logical connections to one or more remote computers 860. A remote computer(s) 860 may include a personal computer (PC), a server, a router, a network PC, a workstation, a microprocessor-based appliance, a peer device, a smart phone, a tablet, another network note, and/or the like. Remote computer(s) 860 typically include many of the elements described relative to data processing system 800. Remote computer(s) 860 may be logically connected to data processing system 800 through a network interface 862 which is connected to data processing system 800 via communications unit 810. Network interface 862 encompasses wired and/or wireless communication networks, such as local-area networks (LAN), wide-area networks (WAN), and cellular networks. LAN technologies may include Fiber Distributed Data Interface (FDDI), Copper Distributed Data Interface (CDDI), Ethernet, Token Ring, and/or the like. WAN technologies include point-to-point links, circuit switching networks (e.g., Integrated Services Digital networks (ISDN) and variations thereon), packet switching networks, and Digital Subscriber Lines (DSL).

Codec 830 may include an encoder, a decoder, or both, comprising hardware, software, or a combination of hardware and software. Codec 830 may include any suitable device and/or software configured to encode, compress, and/or encrypt a data stream or signal for transmission and storage, and to decode the data stream or signal by decoding, decompressing, and/or decrypting the data stream or signal (e.g., for playback or editing of a video). Although codec 830 is depicted as a separate component, codec 830 may be contained or implemented in memory, e.g., non-volatile memory 842.

Non-volatile memory 842 may include read only memory (ROM), programmable ROM (PROM), electrically programmable ROM (EPROM), electrically erasable programmable ROM (EEPROM), flash memory, and/or the like, or any combination of these. Volatile memory 840 may include random access memory (RAM), which may act as external cache memory. RAM may comprise static RAM (SRAM), dynamic RAM (DRAM), synchronous DRAM (SDRAM), double data rate SDRAM (DDR SDRAM), enhanced SDRAM (ESDRAM), and/or the like, or any combination of these.

Instructions for the operating system, applications, and/or programs may be located in storage devices 816, which are in communication with processor unit 804 through system bus 802. In these illustrative examples, the instructions are in a functional form in persistent storage 808. These instructions may be loaded into memory 806 for execution by processor unit 804. Processes of one or more embodiments of the present disclosure may be performed by processor unit 804 using computer-implemented instructions, which may be located in a memory, such as memory 806.

These instructions are referred to as program instructions, program code, computer usable program code, or computer-readable program code executed by a processor in processor unit 804. The program code in the different embodiments may be embodied on different physical or computer-readable storage media, such as memory 806 or persistent storage 808. Program code 818 may be located in a functional form on computer-readable media 820 that is selectively removable and may be loaded onto or transferred to data processing system 800 for execution by processor unit 804. Program code 818 and computer-readable media 820 form computer program product 822 in these examples. In one example, computer-readable media 820 may comprise computer-readable storage media 824 or computer-readable signal media 826.

Computer-readable storage media 824 may include, for example, an optical or magnetic disk that is inserted or placed into a drive or other device that is part of persistent storage 808 for transfer onto a storage device, such as a hard drive, that is part of persistent storage 808. Computer-readable storage media 824 also may take the form of a persistent storage, such as a hard drive, a thumb drive, or a flash memory, that is connected to data processing system 800. In some instances, computer-readable storage media 824 may not be removable from data processing system 800.

In these examples, computer-readable storage media 824 is a non-transitory, physical or tangible storage device used to store program code 818 rather than a medium that propagates or transmits program code 818. Computer-readable storage media 824 is also referred to as a computer-readable tangible storage device or a computer-readable physical storage device. In other words, computer-readable storage media 824 is media that can be touched by a person.

Alternatively, program code 818 may be transferred to data processing system 800, e.g., remotely over a network, using computer-readable signal media 826. Computer-readable signal media 826 may be, for example, a propagated data signal containing program code 818. For example, computer-readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer-readable signal media 826 for use within data processing system 800. For instance, program code stored in a computer-readable storage medium in a server data processing system may be downloaded over a network from the server to data processing system 800. The computer providing program code 818 may be a server computer, a client computer, or some other device capable of storing and transmitting program code 818.

In some examples, program code 18 may comprise be an operating system (OS) 850. Operating system 850, which may be stored on persistent storage 808, controls and allocates resources of data processing system 800. One or more applications 852 take advantage of the operating system's management of resources via program modules 854, and program data 856 stored on storage devices 816. OS 850 may include any suitable software system configured to manage and expose hardware resources of computer 800 for sharing and use by applications 852. In some examples, OS 850 provides application programming interfaces (APIs) that facilitate connection of different type of hardware and/or provide applications 852 access to hardware and OS services. In some examples, certain applications 852 may provide further services for use by other applications 852, e.g., as is the case with so-called "middleware." Aspects of present disclosure may be implemented with respect to various operating systems or combinations of operating systems.

The different components illustrated for data processing system 800 are not meant to provide architectural limitations to the manner in which different embodiments may be implemented. One or more embodiments of the present disclosure may be implemented in a data processing system that includes fewer components or includes components in addition to and/or in place of those illustrated for computer 800. Other components shown in FIG. 11 can be varied from the examples depicted. Different embodiments may be implemented using any hardware device or system capable of running program code. As one example, data processing system 800 may include organic components integrated with inorganic components and/or may be comprised entirely of organic components (excluding a human being). For example, a storage device may be comprised of an organic semiconductor.

In some examples, processor unit 804 may take the form of a hardware unit having hardware circuits that are specifically manufactured or configured for a particular use, or to produce a particular outcome or progress. This type of hardware may perform operations without needing program code 818 to be loaded into a memory from a storage device to be configured to perform the operations. For example, processor unit 804 may be a circuit system, an application specific integrated circuit (ASIC), a programmable logic device, or some other suitable type of hardware configured (e.g., preconfigured or reconfigured) to perform a number of operations. With a programmable logic device, for example, the device is configured to perform the number of operations and may be reconfigured at a later time. Examples of programmable logic devices include, a programmable logic array, a field programmable logic array, a field programmable gate array (FPGA), and other suitable hardware devices. With this type of implementation, executable instructions (e.g., program code 818) may be implemented as hardware, e.g., by specifying an FPGA configuration using a hardware description language (HDL) and then using a resulting binary file to (re)configure the FPGA.

In another example, data processing system 800 may be implemented as an FPGA-based (or in some cases ASIC-based), dedicated-purpose set of state machines (e.g., Finite State Machines (FSM)), which may allow critical tasks to be isolated and run on custom hardware. Whereas a processor such as a CPU can be described as a shared-use, general purpose state machine that executes instructions provided to it, FPGA-based state machine(s) are constructed for a special purpose and may execute hardware-coded logic without sharing resources. Such systems are often utilized for safety-related and mission-critical tasks.

In still another illustrative example, processor unit 804 may be implemented using a combination of processors found in computers and hardware units. Processor unit 804 may have a number of hardware units and a number of processors that are configured to run program code 818. With this depicted example, some of the processes may be implemented in the number of hardware units, while other processes may be implemented in the number of processors.

In another example, system bus 802 may comprise one or more buses, such as a system bus or an input/output bus. Of course, the bus system may be implemented using any suitable type of architecture that provides for a transfer of data between different components or devices attached to the bus system. System bus 802 may include several types of bus structure(s) including memory bus or memory controller, a peripheral bus or external bus, and/or a local bus using any variety of available bus architectures (e.g., Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI)).

Additionally, communications unit 810 may include a number of devices that transmit data, receive data, or both transmit and receive data. Communications unit 810 may be, for example, a modem or a network adapter, two network adapters, or some combination thereof. Further, a memory may be, for example, memory 806, or a cache, such as that found in an interface and memory controller hub that may be present in system bus 802.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

G. Illustrative Distributed Data Processing System

Figure 12:
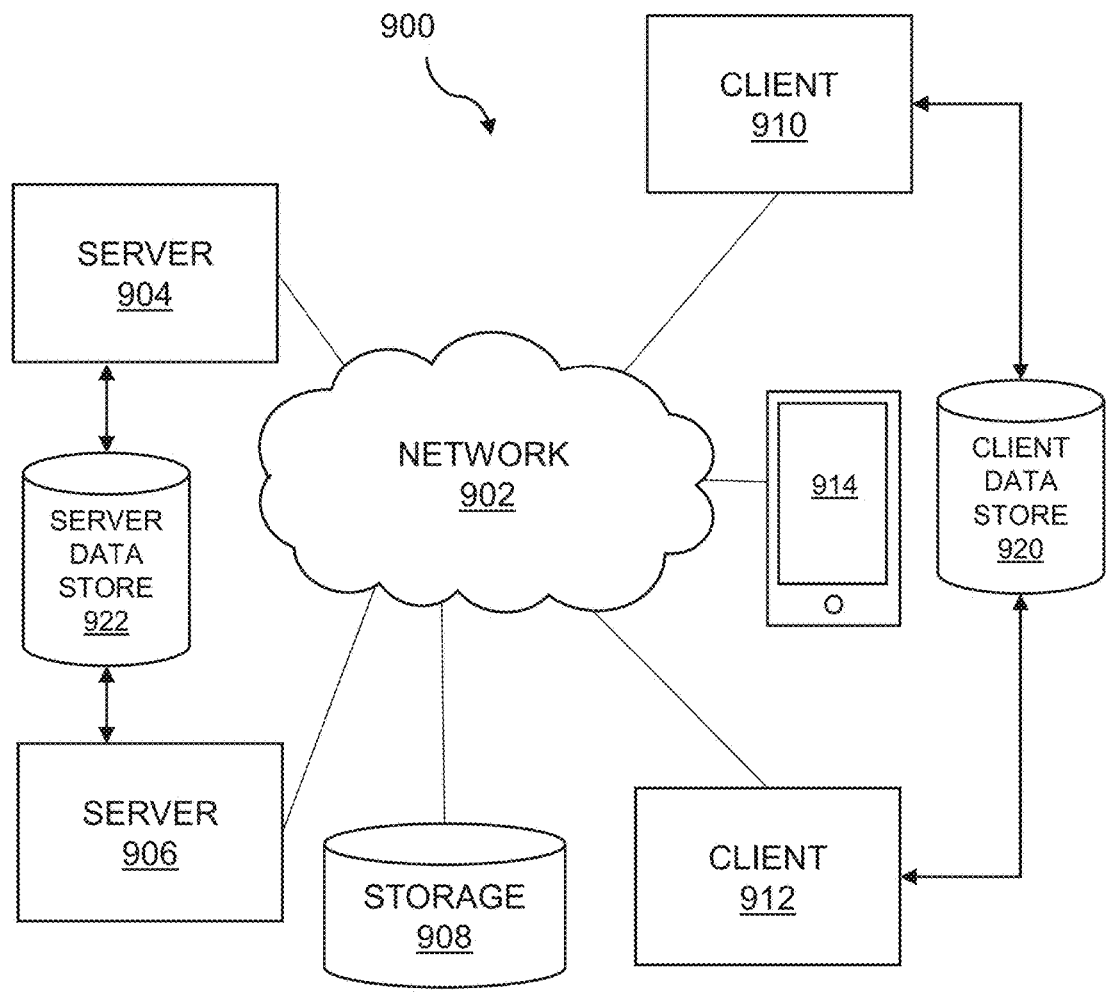
FIG. 12 is a schematic representation of an illustrative computer network suitable for use with aspects of the present disclosure.

As shown in FIG. 12, this example describes a general network data processing system 900, interchangeably termed a computer network, a network system, a distributed data processing system, or a distributed network, aspects of which may be included in one or more illustrative embodiments of the incident command system described herein. For example, computer network 30 is an example of a distributed data processing system such as system 900.

It should be appreciated that FIG. 12 is provided as an illustration of one implementation and is not intended to imply any limitation with regard to environments in which different embodiments may be implemented. Many modifications to the depicted environment may be made.

Network system 900 is a network of devices (e.g., computers), each of which may be an example of data processing system 800, and other components. Network data processing system 900 may include network 902, which is a medium configured to provide communications links between various devices and computers connected within network data processing system 900. Network 902 may include connections such as wired or wireless communication links, fiber optic cables, and/or any other suitable medium for transmitting and/or communicating data between network devices, or any combination thereof.

In the depicted example, a first network device 904 and a second network device 906 connect to network 902, as do one or more computer-readable memories or storage devices 908. Network devices 904 and 906 are each examples of data processing system 800, described above. In the depicted example, devices 904 and 906 are shown as server computers, which are in communication with one or more server data store(s) 922 that may be employed to store information local to server computers 904 and 906, among others. However, network devices may include, without limitation, one or more personal computers, mobile computing devices such as personal digital assistants (PDAs), tablets, and smartphones, handheld gaming devices, wearable devices, tablet computers, routers, switches, voice gates, servers, electronic storage devices, imaging devices, media players, and/or other networked-enabled tools that may perform a mechanical or other function. These network devices may be interconnected through wired, wireless, optical, and other appropriate communication links.

In addition, client electronic devices 910 and 912 and/or a client smart device 914, may connect to network 902. Each of these devices is an example of data processing system 800, described above regarding FIG. 11. Client electronic devices 910, 912, and 914 may include, for example, one or more personal computers, network computers, and/or mobile computing devices such as personal digital assistants (PDAs), smart phones, handheld gaming devices, wearable devices, and/or tablet computers, and the like. In the depicted example, server 904 provides information, such as boot files, operating system images, and applications to one or more of client electronic devices 910, 912, and 914. Client electronic devices 910, 912, and 914 may be referred to as "clients" in the context of their relationship to a server such as server computer 904. Client devices may be in communication with one or more client data store(s) 920, which may be employed to store information local to the clients (e.g., cookie(s) and/or associated contextual information). Network data processing system 900 may include more or fewer servers and/or clients (or no servers or clients), as well as other devices not shown.

In some examples, first client electric device 910 may transfer an encoded file to server 904. Server 904 can store the file, decode the file, and/or transmit the file to second client electric device 912. In some examples, first client electric device 910 may transfer an uncompressed file to server 904 and server 904 may compress the file. In some examples, server 904 may encode text, audio, and/or video information, and transmit the information via network 902 to one or more clients.

Client smart device 914 may include any suitable portable electronic device capable of wireless communications and execution of software, such as a smartphone or a tablet. Generally speaking, the term "smartphone" may describe any suitable portable electronic device configured to perform functions of a computer, typically having a touchscreen interface, Internet access, and an operating system capable of running downloaded applications. In addition to making phone calls (e.g., over a cellular network), smartphones may be capable of sending and receiving emails, texts, and multimedia messages, accessing the Internet, and/or functioning as a web browser. Smart devices (e.g., smartphones) may also include features of other known electronic devices, such as a media player, personal digital assistant, digital camera, video camera, and/or global positioning system. Smart devices (e.g., smartphones) may be capable of connecting with other smart devices, computers, or electronic devices wirelessly, such as through near field communications (NFC), BLUETOOTH®, WiFi, or mobile broadband networks. Wireless connectively may be established among smart devices, smartphones, computers, and/or other devices to form a mobile network where information can be exchanged.

Data and program code located in system 900 may be stored in or on a computer-readable storage medium, such as network-connected storage device 908 and/or a persistent storage 808 of one of the network computers, as described above, and may be downloaded to a data processing system or other device for use. For example, program code may be stored on a computer-readable storage medium on server computer 904 and downloaded to client 910 over network 902, for use on client 910. In some examples, client data store 920 and server data store 922 reside on one or more storage devices 908 and/or 808.

Network data processing system 900 may be implemented as one or more of different types of networks. For example, system 900 may include an intranet, a local area network (LAN), a wide area network (WAN), or a personal area network (PAN). In some examples, network data processing system 900 includes the Internet, with network 902 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. In some examples, network 902 may be referred to as a "cloud." In those examples, each server 904 may be referred to as a cloud computing node, and client electronic devices may be referred to as cloud consumers, or the like. FIG. 12 is intended as an example, and not as an architectural limitation for any illustrative embodiments.

H. Additional Examples of ICS Methods

Figure 15:
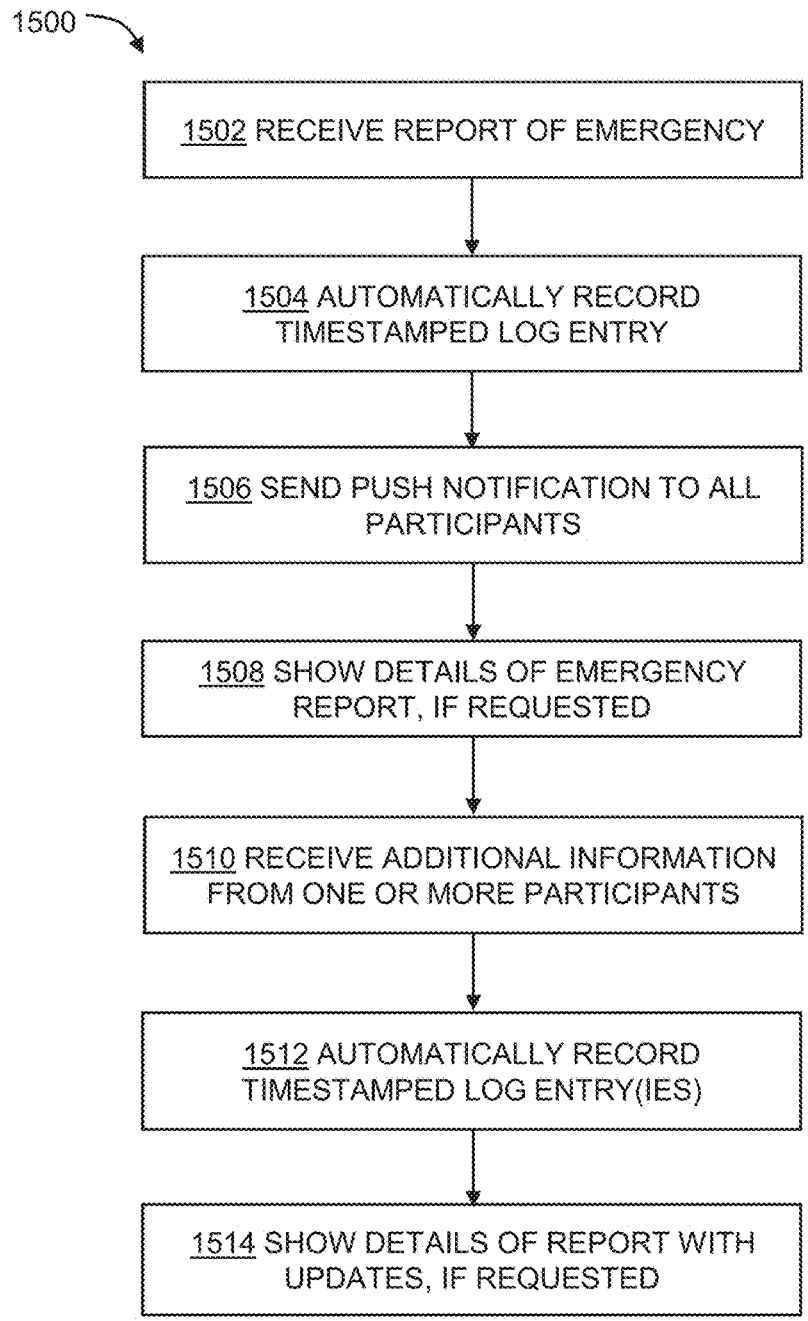
FIG. 15 is a flow chart depicting steps of another illustrative method of using the ICS of FIG. 1.

This section describes steps of another illustrative method 1500 for facilitating command of an incident scene using an incident command system, e.g., system 10; see FIG. 15. Aspects of ICS 10 may be utilized in the method steps described below. Where appropriate, reference may be made to components and systems that may be used in carrying out each step. These references are for illustration and are not intended to limit the possible ways of carrying out any particular step of the method.

FIG. 15 is a flowchart illustrating steps performed in an illustrative method and may not recite the complete process or all steps of the method. Although various steps of method 1500 are described below and depicted in FIG. 15, the steps need not necessarily all be performed, and in some cases may be performed simultaneously or in a different order than shown. Additionally, method 1500 may include one or more steps of the other methods described in the present disclosure (such as method 200 in FIG. 3) instead, or in addition to, the steps described below. For example, one or more steps of method 1500 may be performed to obtain information regarding an incident and then one or more steps of methods 200, 300, 400, 500, and/or 600 may be performed to respond to the incident.

Figure 16:
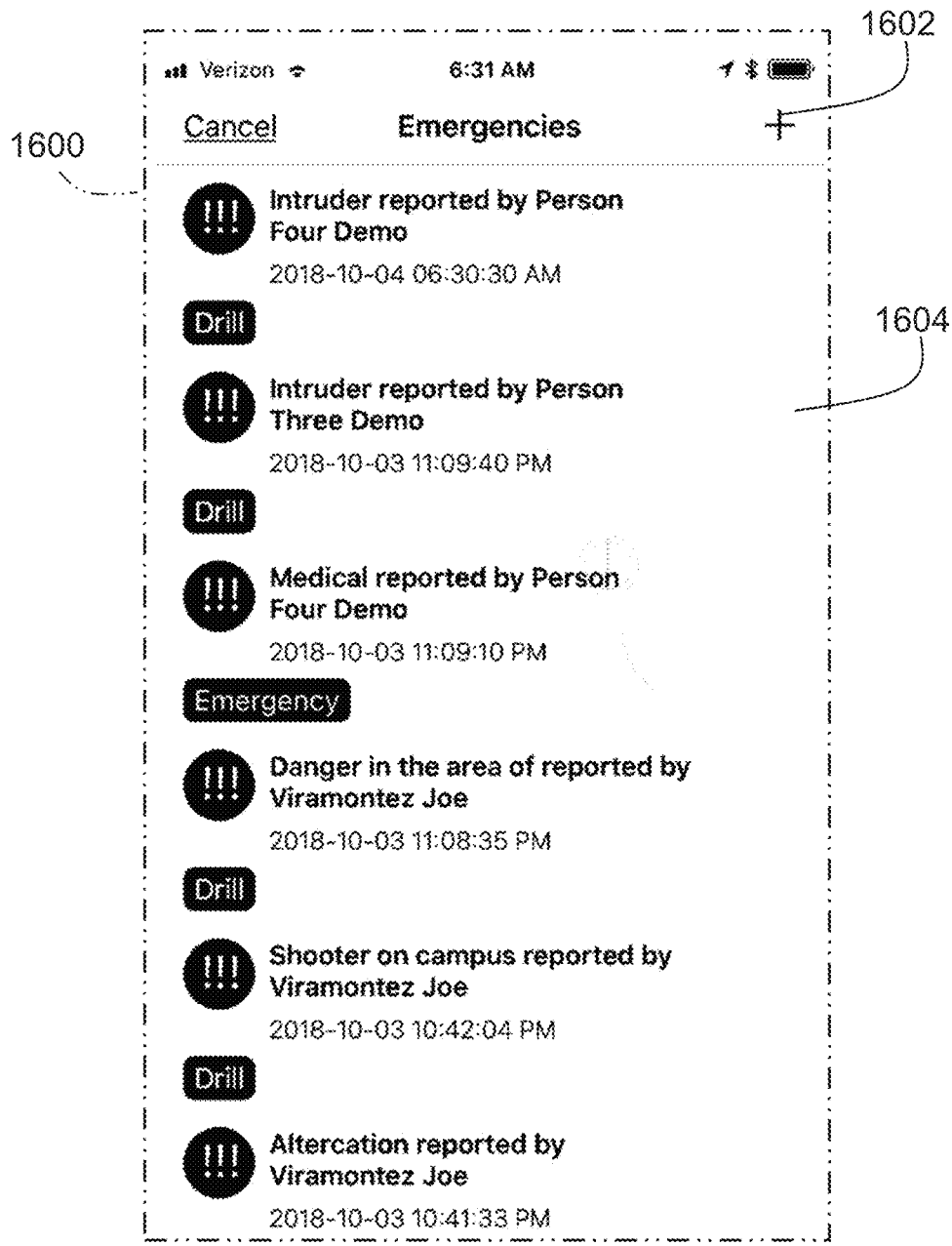
FIGS. 16-21 depict an illustrative graphical user interface (GUI) displayed by an ICS application running on a mobile digital device, the GUI being configured to facilitate reporting of an incident by a user.
Figure 17:
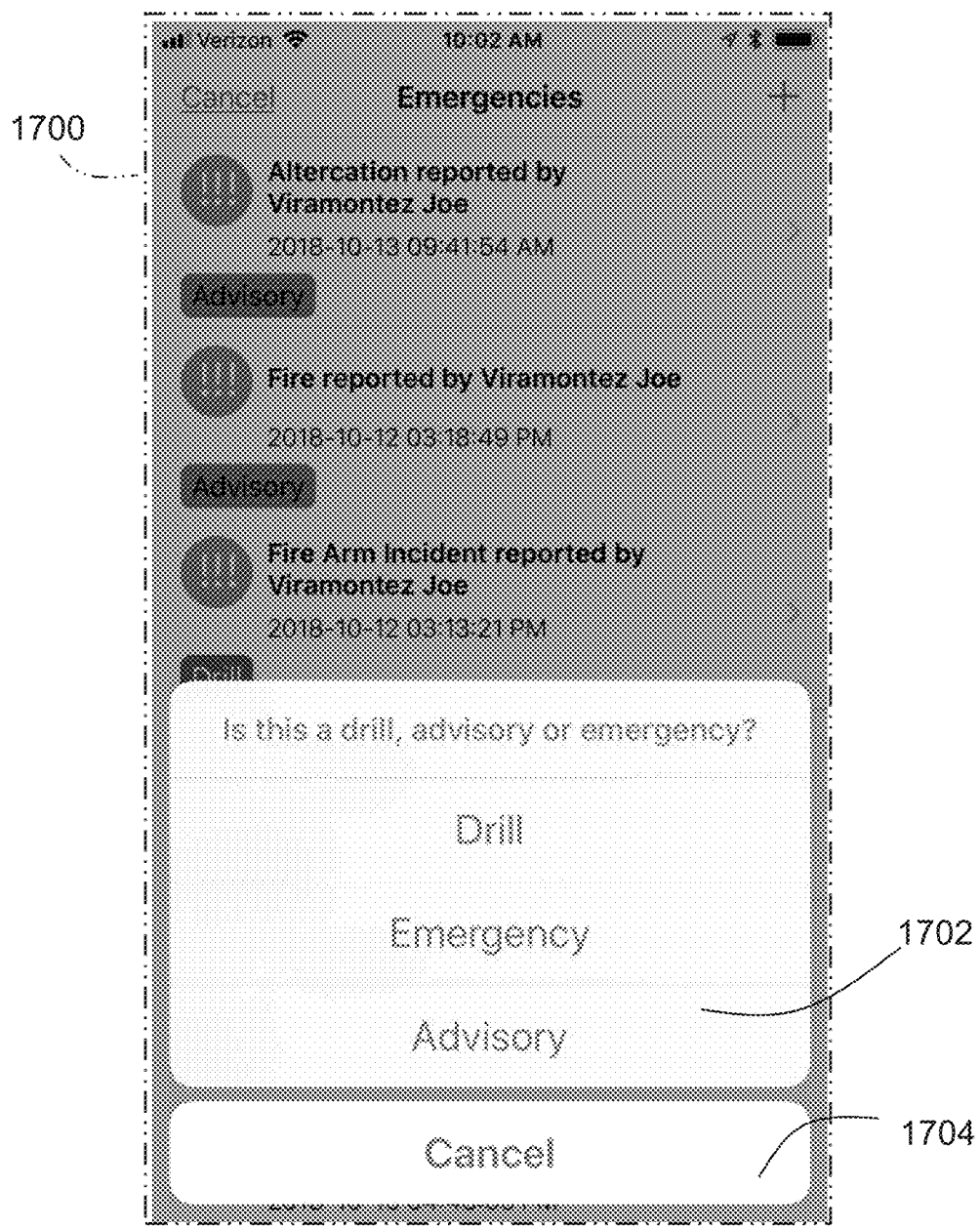
Figure 18:
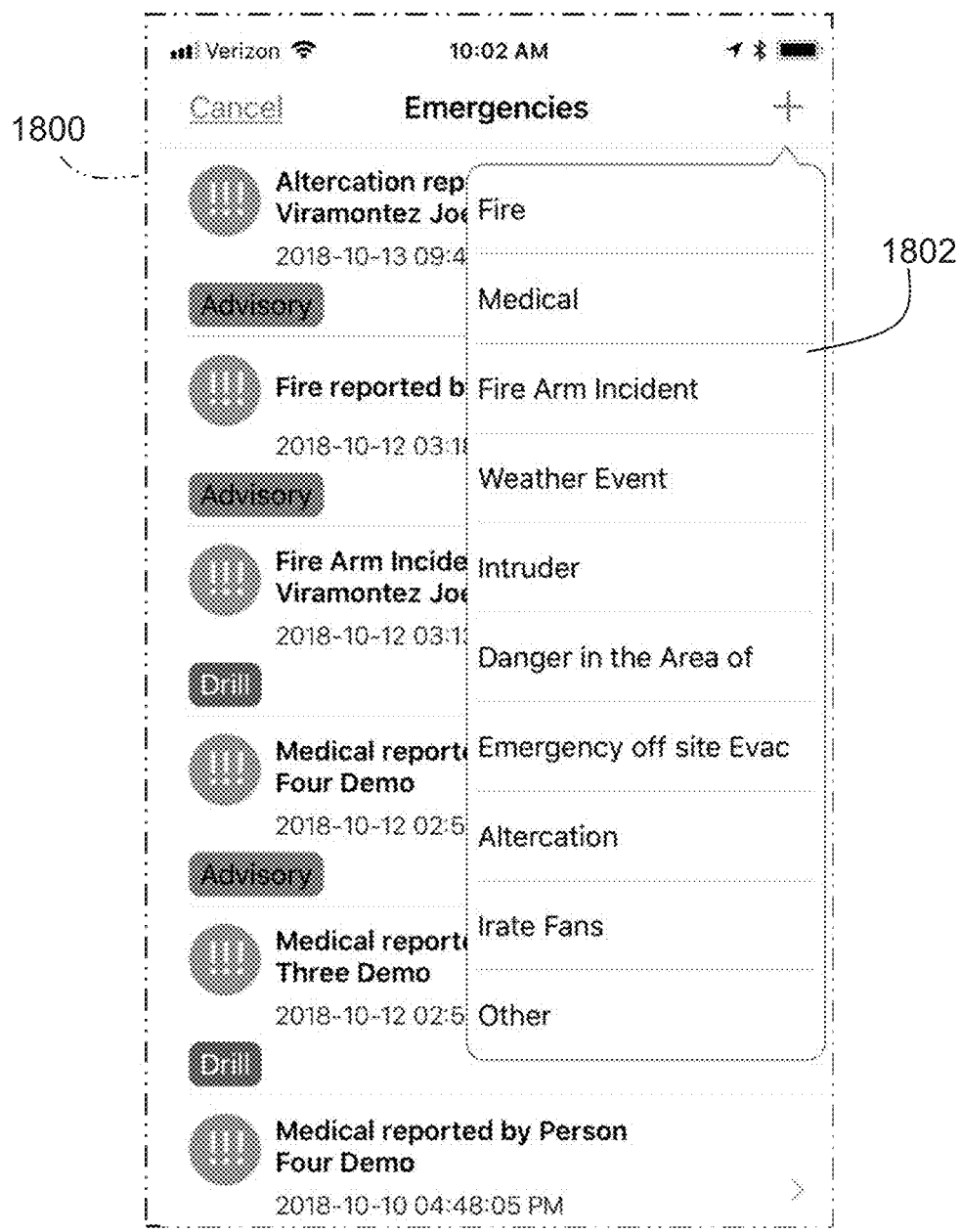

At step 1502 of method 1500, ICS 10 receives a report of an incident or emergency. This step may be initiated by any agent having ICS app 40 on his or her MDD 12. As described above, and with reference to FIG. 16, GUI 1600 may be displayed by ICS app 40 on MDD 12, e.g., in response to a user's selection of a "report incident" or "emergency alert" button, or the like. A list of previous incidents may be shown. To report a new incident, a user may select the "+" button 1602 in GUI 1600. In response, menus 1702 and 1802 in FIGS. 17-18 may be provided for the user to select labels and/or categories for the incident, such as whether the incident is a "drill," "emergency," or "advisory" or whether the incident is "fire," "medical," "fire arm incident," "weather event," "intruder," "danger in the area of," "emergency off site evac," "altercation," "irate fans," or "other." Other labels and/or categories may be provided instead of, or in addition to, what are shown in FIGS. 17-18. In some examples, a user may be able to input their own label and/or category via the appropriate GUI. In other examples, the menus are customizable by the user prior to creating a new incident report A cancel button 1704 also may be provided to cancel the creating of a new incident report.

Figure 19:
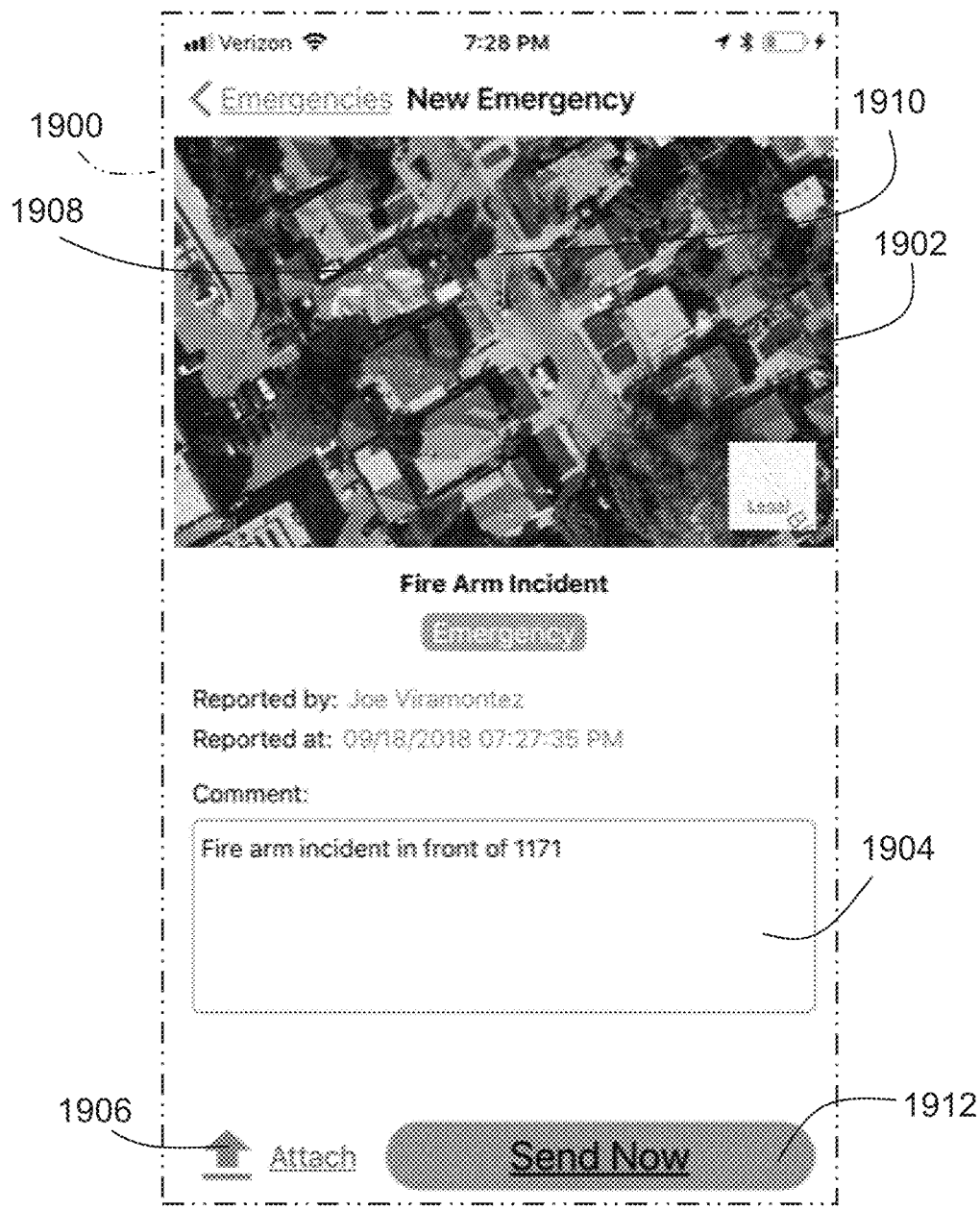

Initially, GUI 1900 may automatically zoom to a view of the agent's general area, based on the MDD's global positioning system (GPS) coordinates, as shown in FIG. 19. Map 1902 can then be manipulated by the agent to display the actual area of the incident being reported, e.g., by pinching and zooming using a touch-enabled screen. Map 1902 may be a satellite (or photographic) view map, road map, terrain map, and/or any suitable combinations. More specifically, in some examples, the agent's location is shown as an agent locator 1908 and the agent also may position incident locator or incident target 1910 over the displayed map, corresponding to a more precise location of the incident. In some examples, the location of the reporting agent and/or one or more responding parties also may be indicated via one or more cursors and/or targets, as shown previously in FIGS. 13-14.

Although agent dot 1908 and incident target 1910 are shown as dots in FIG. 19, any suitable cursor or icon (of any suitable pattern and/or color) may be used, such as a plus sign, an "x," a box, or the like. The reporting agent's name, date, and/or time of report may be automatically populated, and a text box 1904 may be provided for entering comments and further details about the incident. Additionally, the reporting agent may attach one or more files (such as text documents, image files, audio files, video files, etc.) by tapping on the attach button 1906. In some examples, the agent may add a description to the attachments, such as a description on an image file. After completing as much of the form as desired, the agent may press, tap, or click button 1912 to report the incident to system 10 using ICS app 40.

At step 1504 of method 1500, ICS 10 responds to the report of an incident by automatically recording a time-stamped log entry of the report. At step 1506, ICS automatically sends a push notification or other suitable alert to each of the other MDDs 12. For example, each agent may experience a pop-up message and/or alert sound on his or her MDD, indicating that an incident has been reported by the specified agent.

At step 1508 of method 1500, ICS 10 responds to a request for more details by displaying the information provided at step 1502 by the reporting agent, including the map and any comments. The request for more details about the incident may be initiated by any agent, e.g., by tapping on the push alert and/or by selecting a corresponding button or other interface element. A list of such reported incidents may be maintained by the system (such as list 1604 shown in FIG. 16), and the agent may therefore also need to select the incident in question from that list. The most recently reported incident may displayed at the top of the list. Alternatively, the incident with most recent update may be displayed at the top of the list. In some examples, the GUI may allow a user to sort and/or filter items on the list based on timestamped log entries, labels, categories, etc.

Figure 20:
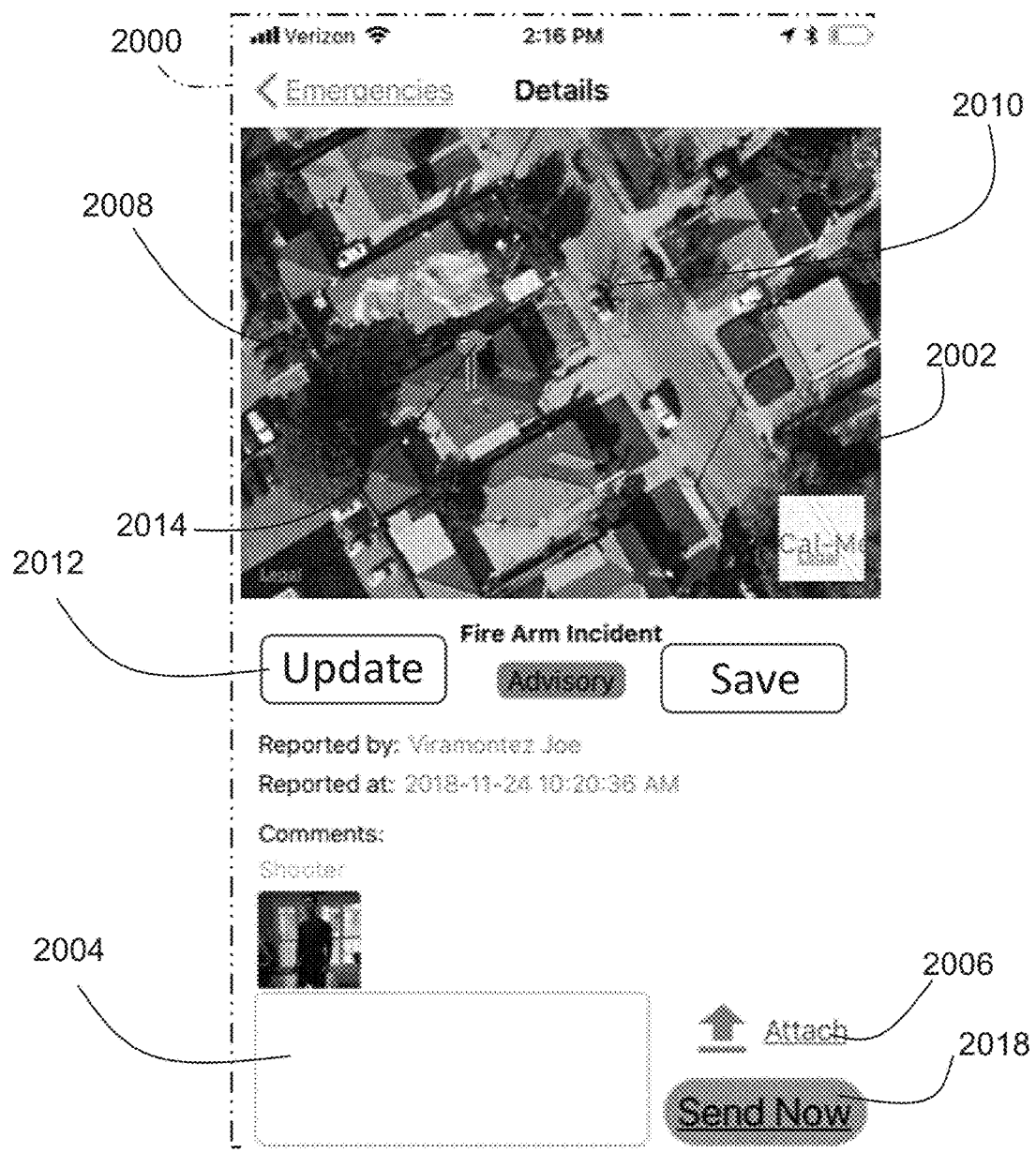

When the agent selects the incident in question from the list, the information provided at step 1502 is displayed. For example, FIG. 20 shows a portion of the information provided at step 1502, including a map 2002, an initial reporting agent locator 2008, an incident target 2010, and any attachment(s). The locator 2008 may be the location of the initial reporting agent when the information was provided at step 1502 or may be the current location of that agent. Although not shown in FIG. 20, any comments provided at step 1502 also may be shown.

At step 1510, ICS 10 receives additional information regarding the incident. When viewing the incident report as described above, the agent is given the option to provide an update or additional information regarding the incident. For example, the agent may select update button 2012 and then provide additional information. The updating agent's name, date, and/or time of report may be automatically populated, and a text box 2004 may be provided for entering comments and further details about the incident. Additionally, the reporting agent may attach one or more files (such as text documents, image files, audio files, video files, etc.) by tapping on the attach button 2006. In some examples, the agent may add a description to the attachments, such as a description on an image file. The location of the updating agent also may be shown on the map via agent locator 2014. After completing as much of the form as desired, the agent may press, tap, or click save button 2016 and/or send now button 2018 to report the incident to system 10 using ICS app 40.

At step 1512 of method 1500, ICS 10 responds to the update or additional information regarding the incident by automatically recording a timestamped log entry of the additional information. At step 1514, ICS automatically sends a push notification or other suitable alert to each of the other MDDs 12. For example, each agent may experience a pop-up message and/or alert sound on his or her MDD, indicating that an update to an incident has been reported by the specified agent. Steps 1508-1512 may be repeated as many times as appropriate if there are several agents providing updates and/or additional information for a particular incident.

At step 1514 of method 1500, ICS 10 responds to a request for more details by displaying all the information received for a particular incident. The request for more details about the incident may be initiated by any agent, e.g., by tapping on the push alert and/or by selecting a corresponding button or other interface element. A list of such reported incidents may be maintained by the system (such as list 1604 shown in FIG. 16), and the agent may therefore also need to select the incident in question from that list. The most recently reported incident may displayed at the top of the list. Alternatively, the incident with most recent update may be displayed at the top of the list. An "update" icon or label may be shown with the incidents having newly received additional information.

Figure 21:
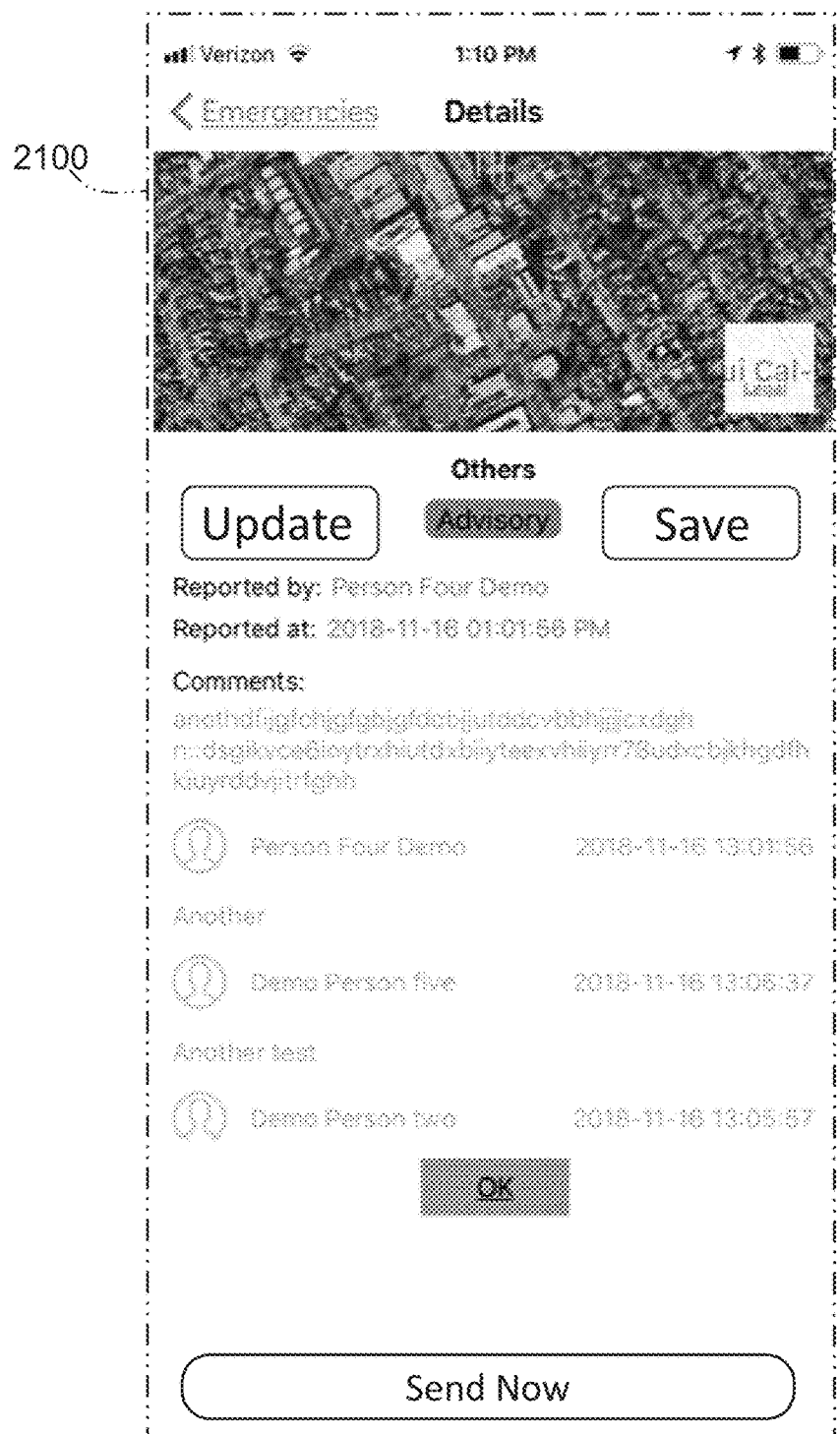

FIG. 21 shows GUI 2100 displaying information on another illustrative incident having multiple updates from various agents. The original report may be displayed in the upper portion with the text description and any attachments, and the updates (with any text description and/or attachments) may be provided below the original report. Each update may include the agent's name, and a date and time stamp for the update. GUI 2100 includes several buttons (similar to the buttons shown in FIG. 20) to allow an agent to provide further updates on the particular incident.

I. Illustrative Combinations and Additional Examples

This section describes additional aspects and features of incident command systems, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A method, implemented in a data processing system, the method comprising:
receiving, using a data processing system, a request from a first user for access to a list of children;
transmitting, using a communications unit of the data processing system, the list of children to the first user;
receiving, using the data processing system, a selection of a child, the selection made by the first user;
creating a log file associated with the child;
transmitting, using the communications unit of the data processing system, a list of approved adults associated with the child to the first user;
receiving, using the data processing system, a selection of an approved adult from the list of approved adults, the selection made by the first user;
automatically creating, using the processor of the data processing system, a first time stamp associated with the receiving of the selection of the approved adult, and recording the first time stamp in the log file associated with the child;
receiving, using the data processing system, a send request from the first user, the send request being a request to deliver the child to an exit gate;
automatically creating, using the processor of the data processing system, a second time stamp associated with the receiving of the send request, and recording the second time stamp in the log file associated with the child;
receiving, using the data processing system, a confirmation of the send request from the first user;
automatically creating, using the processor of the data processing system, a third time stamp associated with the receiving of the confirmation of the send request and recording the third time stamp in the log file associated with the child;
transmitting, using the communications unit of the data processing system, a send message to a second user, the send message directing the second user to send the child to the exit gate;
receiving, using the data processing system, a receipt of the send message from the second user, the receipt of the send message indicating that the second user has sent the child to the exit gate;
automatically creating, using the processor of the data processing system, a fourth time stamp associated with the receipt of the send message and recording the fourth time stamp in the log file associated with the child;
transmitting, using the communications unit of the data processing system, an en route message to a third user, the en route message indicating to the third user that the child is en route to the exit gate;
receiving, using the data processing system, a receipt of the en route message from the third user, the receipt of the en route message indicating that the child has been reunited with the approved adult; and
automatically creating, using the processor of the data processing system, a fifth time stamp associated with the receipt of the en route message and recording the fifth time stamp in the log file associated with the child.

A2. The method of paragraph A1, further comprising: accessing, using a processor of the data processing system, a list of approved adults associated with the child.

A3. The method of paragraph A1, further comprising: receiving, using the processor of the data processing system, an identification of the first user as a Student Release Leader.

A4. The method of paragraph A1, further comprising: receiving, using the processor of the data processing system, an identification of the second user as a Division Leader.

A5. The method of paragraph A1, further comprising: receiving, using the processor of the data processing system, an identification of the third user as a Transportation Leader.

B1. A method, implemented in a data processing system, the method comprising:

receiving, using a data processing system, a request from a first user for access to a list of children;

transmitting, using a communications unit of the data processing system, the list of children to the first user;

receiving, using the data processing system, a selection of a child, the selection made by the first user;

creating a log file associated with the child;

transmitting, using the communications unit of the data processing system, a list of approved adults associated with the child to the first user;

receiving, using the data processing system, a selection of an approved adult from the list of approved adults, the selection made by the first user;

receiving, using the data processing system, a send request from the first user, the send request being a request to deliver the child to an exit gate;

receiving, using the data processing system, a confirmation of the send request from the first user;

transmitting, using the communications unit of the data processing system, a send message to a second user, the send message directing the second user to send the child to the exit gate;

receiving, using the data processing system, a receipt of the send message from the second user, the receipt of the send message indicating that the second user has sent the child to the exit gate;

transmitting, using the communications unit of the data processing system, an en route message to a third user, the en route message indicating to the third user that the child is en route to the exit gate; and receiving, using the data processing system, a receipt of the en route message from the third user, the receipt of the en route message indicating that the child has been reunited with the approved adult.

C1. A method, implemented in a data processing system, the method comprising:

receiving, using a data processing system, input from a user of the data processing system designating the user as a student release leader (SRL);

transmitting, using a communications unit of the data processing system, the designation of the user as a student release leader to a server;

receiving, using the communications unit of the data processing system, a list of children from the server;

receiving, using the data processing system, a selection of a child from the list of children, the selection of the child made by the user;

transmitting, using the communications unit of the data processing system, an identification of the child to the server;

receiving, using the communications unit of the data processing system, a list of approved adults associated with the child from the server;

receiving, using the data processing system, a selection of an approved adult from the list of approved adults, the selection of the approved adult made by the user;

transmitting, using the communications unit of the data processing system, an identification of the approved adult to the server;

transmitting, using the communications unit of the data processing system, a send request to the server, the send request being a request to deliver the child to an exit gate; and transmitting, using the communications unit of the data processing system, a confirmation of the send request to the server.

D1. A method, implemented in a data processing system, the method comprising:

receiving, using a data processing system, input from a user of the data processing system designating the user as a division leader (DL);

transmitting, using a communications unit of the data processing system, the designation of the user as a division leader to a server;

receiving, using the communications unit of the data processing system, a send message from the server, the send message directing the second user to send a child to the exit gate;

receiving, using the data processing system, input from the user indicating that the send message has been received; and transmitting, using the communications unit of the data processing system, a receipt of the send message to the server, the receipt of the send message indicating that the child is en route to the exit gate.

E1. A method, implemented in a data processing system, the method comprising:

receiving, using a data processing system, input from a user of the data processing system designating the user as a transportation leader (TL);

transmitting, using a communications unit of the data processing system, the designation of the user as a transportation leader to a server;

receiving, using the communications unit of the data processing system, an en route message from the server, the en route message indicating to the user that the child is en route to an exit gate;

receiving, using the data processing system, input from the user indicating that the en route message has been received; and transmitting, using the data processing system, a receipt of the en route message to the server, the receipt of the en route message indicating that the child has been reunited with an approved adult.

F1. A data processing system for organizing a documenting release of children from a school, the system comprising:
  a processor;
  a memory; and
  a child release program including a plurality of instructions stored in the memory and executable by the processor to:
    receive a request from a first user for access to a list of children;
    transmit the list of children to the first user;
    receive a selection of a child, the selection made by the first user;
    create a log file associated with the child;
    transmit a list of approved adults associated with the child to the first user;
    receive a selection of an approved adult from the list of approved adults, the selection made by the first user;
    receive a send request from the first user, the send request being a request to deliver the child to an exit gate;
    receive a confirmation of the send request from the first user;

transmit a send message to a second user, the send message directing the second user to send the child to the exit gate;

receive a receipt of the send message from the second user, the receipt of the send message indicating that the second user has sent the child to the exit gate;

transmit an en route message to a third user, the en route message indicating to the third user that the child is en route to the exit gate; and receive a receipt of the en route message from the third user, the receipt of the en route message indicating that the child has been reunited with the approved adult.

G1. A computer program product for organizing a documenting release of children from a school, the computer program product comprising:

a non-transitory computer-readable storage medium having computer-readable program code embodied therewith, the computer readable program code comprising:

at least one instruction to receive a request from a first user for access to a list of children;

at least one instruction to transmit the list of children to the first user;

at least one instruction to receive a selection of a child, the selection made by the first user;

at least one instruction to create a log file associated with the child;

at least one instruction to transmit a list of approved adults associated with the child to the first user;

at least one instruction to receive a selection of an approved adult from the list of approved adults, the selection made by the first user;

at least one instruction to receive a send request from the first user, the send request being a request to deliver the child to an exit gate;

at least one instruction to receive a confirmation of the send request from the first user;

at least one instruction to transmit a send message to a second user, the send message directing the second user to send the child to the exit gate;

at least one instruction to receive a receipt of the send message from the second user, the receipt of the send message indicating that the second user has sent the child to the exit gate;

at least one instruction to transmit an en route message to a third user, the en route message indicating to the third user that the child is en route to the exit gate; and at least one instruction to receive a receipt of the en route message from the third user, the receipt of the en route message indicating that the child has been reunited with the approved adult.

H1. A data processing system for organizing a documenting release of children from a school, the system comprising:
a processor;
a memory; and
a child release program including a plurality of instructions stored in the memory and executable by the processor to:

receive input from a user of the data processing system designating the user as a student release leader (SRL);

transmit the designation of the user as a student release leader to a server;

receive a list of children from the server;

receive a selection of a child from the list of children, the selection of the child made by the user;

transmit an identification of the child to the server;

receive a list of approved adults associated with the child from the server;

receive a selection of an approved adult from the list of approved adults, the selection of the approved adult made by the user;

transmit an identification of the approved adult to the server;

transmit a send request to the server, the send request being a request to deliver the child to an exit gate; and transmit a confirmation of the send request to the server.

I1. A computer program product for organizing a documenting release of children from a school, the computer program product comprising:

a non-transitory computer-readable storage medium having computer-readable program code embodied therewith, the computer readable program code comprising:

at least one instruction to receive input from a user of the data processing system designating the user as a student release leader (SRL);

at least one instruction to transmit the designation of the user as a student release leader to a server;

at least one instruction to receive a list of children from the server;

at least one instruction to receive a selection of a child from the list of children, the selection of the child made by the user;

at least one instruction to transmit an identification of the child to the server;

at least one instruction to receive a list of approved adults associated with the child from the server;

at least one instruction to receive a selection of an approved adult from the list of approved adults, the selection of the approved adult made by the user;

at least one instruction to transmit an identification of the approved adult to the server;

at least one instruction to transmit a send request to the server, the send request being a request to deliver the child to an exit gate; and at least one instruction to transmit a confirmation of the send request to the server.

J1. A data processing system for organizing a documenting release of children from a school, the system comprising:
a processor;
a memory; and
a child release program including a plurality of instructions stored in the memory and executable by the processor to:

receive input from a user of the data processing system designating the user as a division leader (DL);

transmit the designation of the user as a division leader to a server;

receive a send message from the server, the send message directing the second user to send a child to the exit gate;

receive input from the user indicating that the send message has been received; and transmit a receipt of the send message to the server, the receipt of the send message indicating that the child is en route to the exit gate.

K1. A computer program product for organizing a documenting release of children from a school, the computer program product comprising:

a non-transitory computer-readable storage medium having computer-readable program code embodied therewith, the computer readable program code comprising: at least one instruction to receive input from a user of the data processing system designating the user as a division leader (DL);

at least one instruction to transmit the designation of the user as a division leader to a server;

at least one instruction to receive a send message from the server, the send message directing the second user to send a child to the exit gate;

at least one instruction to receive input from the user indicating that the send message has been received; and at least one instruction to transmit a receipt of the send message to the server, the receipt of the send message indicating that the child is en route to the exit gate.

L1. A data processing system for organizing a documenting release of children from a school, the system comprising:

a processor;

a memory; and a child release program including a plurality of instructions stored in the memory and executable by the processor to:

receive input from a user of the data processing system designating the user as a transportation leader (TL);

transmit the designation of the user as a transportation leader to a server;

receive an en route message from the server, the en route message indicating to the user that the child is en route to an exit gate;

receive input from the user indicating that the en route message has been received; and transmit a receipt of the en route message to the server, the receipt of the en route message indicating that the child has been reunited with an approved adult.

M1. A computer program product for organizing a documenting release of children from a school, the computer program product comprising:

a non-transitory computer-readable storage medium having computer-readable program code embodied therewith, the computer readable program code comprising:

at least one instruction to receive input from a user of the data processing system designating the user as a transportation leader (TL);

at least one instruction to transmit the designation of the user as a transportation leader to a server;

at least one instruction to receive an en route message from the server, the en route message indicating to the user that the child is en route to an exit gate;

at least one instruction to receive input from the user indicating that the en route message has been received; and at least one instruction to transmit a receipt of the en route message to the server, the receipt of the en route message indicating that the child has been reunited with an approved adult.

N0. A data processing system for carrying out a release of children from a venue, the data processing system comprising:

one or more processors;

one or more memory devices; and an incident response system application comprising a plurality of instructions stored in the one or more memory devices and executable by the one or more processors to release a plurality of children from a venue by:

receiving, from a mobile digital device (MDD) of a group of associated MDDs, a report of an incident in progress, the report including a location of the incident;

automatically sending a push notification to other MDDs of the group, the push notification containing information about the incident;

displaying a first interactive list containing names of children associated with the venue on at least one MDD of the group, the first interactive list including status information related to each child;

responding to indication of a selected child, from a designated first MDD of the group, by displaying a second interactive list containing names of adults authorized to transport the selected child;

responding to indication of a selected adult from the second interactive list by automatically sending a notification to a designated second MDD of the group, indicating that a user of the second MDD is instructed to send the selected child to an exit of the venue;

responding to indication from a designated third MDD of the group that the selected child has been reunited with the selected adult by automatically recording in the one or more memory devices a timestamped log entry memorializing the reunification.

N1. The system of N0, further comprising:

automatically causing a message to be sent to unselected adults from the second interactive list, wherein the message includes information that the selected child has been reunited with the selected adult.

N2. The system of N1, wherein the message is a text message sent using the short message system (SMS) protocol.

N3. The system of any of paragraphs N0 through N2, wherein the report of the incident includes a visual map selection indicating the location of the incident.

N4. The system of N3, wherein the visual map selection includes a cursor overlaying an aerial image.

N5. The system of any of paragraphs N0 through N4, wherein the first interactive list is filterable by one or more criteria, the one or more criteria including the status information related to each child.

N6. The system of any of paragraphs N0 through N5, further comprising a dedicated software application, a respective instance of the dedicated software application running on each of the MDDs of the group, wherein the dedicated software application comprises at least a portion of the plurality of instructions.

N7. The system of any of paragraphs N0 through N6, wherein the group of MDDs are linked together via a computer network.

N8. The system of N7, wherein the computer network includes at least one server located offsite with respect to the venue.

O0. A computer-implemented method for carrying out a release of children from a venue, the method comprising:

receiving, at a network server from a mobile digital device (MDD) of a group of networked MDDs, a report of an incident in progress, the report including a location of the incident;

automatically sending, from the network server, a push notification to other MDDs of the group, the push notification containing information about the incident;

displaying a first interactive list containing names of children associated with the venue on at least one MDD of the group, the first interactive list including status information related to each child;

responding to indication of a selected child, from a designated first MDD of the group, by displaying a second interactive list containing names of adults authorized to transport the selected child;

responding to indication of a selected adult from the second interactive list by automatically sending a notification to a designated second MDD of the group, indicating that a user of the second MDD is instructed to send the selected child to an exit of the venue;

responding to indication from a designated third MDD of the group that the selected child has been reunited with the selected adult by automatically recording a timestamped log entry memorializing the reunification.

O1. The method of O0, further comprising:
using the network server, automatically causing a message to be sent to unselected adults from the second interactive list, wherein the message includes information that the selected child has been reunited with the selected adult.

O2. The method of O1, wherein the message is a text message sent using the short message method (SMS) protocol.

O3. The method of any of paragraphs O0 through O2, wherein the report of the incident includes a visual map selection indicating the location of the incident.

O4. The method of O3, wherein the visual map selection includes a cursor overlaying an aerial image.

O5. The method of any of paragraphs O0 through O4, wherein the first interactive list is filterable by one or more criteria, the one or more criteria including the status information related to each child.

O6. The method of any of paragraphs O0 through O5, wherein a respective instance of a dedicated software application is running on each of the MDDs of the group.

P0. A computer program product for an incident command system, the computer program product comprising a non-transitory computer-readable medium having computer-readable program code embodied therewith, the computer readable program code configured to:
receive, at a network server from a mobile digital device (MDD) of a group of networked MDDs, a report of an incident in progress, the report including a location of the incident;
automatically send, from the network server, a push notification to other MDDs of the group, the push notification containing information about the incident;
display a first interactive list containing names of children associated with the venue on at least one MDD of the group, the first interactive list including status information related to each child;
respond to indication of a selected child, from a designated first MDD of the group, by displaying a second interactive list containing names of adults authorized to transport the selected child;
respond to indication of a selected adult from the second interactive list by automatically sending a notification to a designated second MDD of the group, indicating that a user of the second MDD is instructed to send the selected child to an exit of the venue;
respond to indication from a designated third MDD of the group that the selected child has been reunited with the selected adult by automatically recording a timestamped log entry memorializing the reunification.

P1. The computer program product of P0, wherein the computer readable program code is further configured to automatically cause a message to be sent to unselected adults from the second interactive list, wherein the message includes information that the selected child has been reunited with the selected adult.

P2. The computer program product of any of paragraphs P0 through P1, wherein the report of the incident includes a visual map selection indicating the location of the incident.

P3. The computer program product of any of paragraphs P0 through P2, wherein the computer readable program code is further configured to cause the first interactive list to be filterable by one or more criteria, the one or more criteria including the status information related to each child.

Advantages, Features, and Benefits

The different embodiments of the incident command systems described herein provide several advantages over known solutions for reporting incidents and for organizing and documenting the release of children from a school or other site in the event of an emergency. For example, illustrative embodiments described herein allow for rapid communication between staff members of the school, using a dedicated channel. Additionally, and among other benefits, illustrative embodiments described herein allow for comprehensive documentation of which children left with which adults and when. No known system or device can perform these functions, particularly in an integrated system that is easy to use and that may be part of a larger incident command system. Thus, the illustrative embodiments described herein are particularly useful for use on schools during an emergency event. However, not all embodiments described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:
1. A data processing system for notifying responders of an emergency, the data processing system comprising:
one or more processors;
one or more memory devices; and
an incident response system application comprising a plurality of instructions stored in the one or more memory devices and executable by the one or more processors to notify responders of an emergency by:
receiving, from a first mobile digital device (MDD) of a group of associated MDDs, a report of an incident in progress, the report including a visual map selection indicating location of the incident;
automatically recording, in the one or more memory devices, a timestamped log entry of the report;
automatically sending a push notification to the group of associated MDDs other than the first MDD, the push notification containing the timestamped log entry of the report;
receiving additional information regarding the incident in progress from a second MDD of the group of associated MDDs, the second MDD being different from the first MDD;
automatically recording in the one or more memory devices a timestamped log entry of the additional information; and
automatically sending a push notification to the group of associated MDDs other than the second MDD, the push notification containing the timestamped log entry of the additional information.

2. The system of claim 1, wherein the visual map selection includes a cursor overlaying a map image.

3. The system of claim 2, wherein the map image is a satellite aerial view image.

4. The system of claim 1, wherein the visual map selection also indicates location of at least one of the first MDD or the second MDD.

5. The system of claim 4, wherein the location is the current location of at least one of the first MDD or the second MDD.

6. The system of claim 1, further comprising a dedicated software application, a respective instance of the dedicated software application running on each of the MDDs of the group, wherein the dedicated software application comprises at least a portion of the plurality of instructions.

7. The system of claim 1, wherein the group of MDDs are linked together via a computer network.

8. The system of claim 7, wherein the computer network includes at least one server that is separate and distinct from the group of associated MDDs.

9. A computer-implemented method for notifying responders of an emergency, the method comprising:
receiving, at a network server from a first mobile digital device (MDD) of a group of networked MDDs, a report of an incident in progress, the report including a visual map selection indicating location of the incident;
automatically recording a timestamped log entry of the report;
automatically sending, from the network server, a push notification to the group of networked MDDs other than the first MDD, the push notification containing the timestamped log entry of the report;
receiving, at the network server from a second MDD of the group of networked MDDs, additional information regarding the incident in progress, the second MDD being different from the first MDD;
automatically recording a timestamped log entry of the additional information; and
automatically sending, from the network server, a push notification to the group of networked MDDs other than the second MDD, the push notification containing the timestamped log entry of the additional information.

10. The method of claim 9, wherein the visual map selection includes a cursor overlaying a map image.

11. The method of claim 10, wherein the map image is a satellite aerial view image.

12. The method of claim 9, where the visual map selection also indicates location of at least one of the first MDD or the second MDD.

13. The method of claim 12, wherein the location of at least one of the first MDD or the second MDD is the current location of at least one of the first MDD or the second MDD.

14. The method of claim 9, wherein a respective instance of a dedicated software application is running on each of the MDDs of the group.

15. A computer program product for an incident command system, the computer program product comprising a non-transitory computer-readable medium having computer-readable program code embodied therewith, the computer readable program code configured to:
receive, at a network server from a first mobile digital device (MDD) of a group of networked MDDs, a report of an incident in progress, the report including a visual map selection indicating location of the incident;
automatically record a timestamped log entry of the report;
automatically send, from the network server, a push notification to the group of networked MDDs other than the first MDD, the push notification containing the timestamped log entry of the report;
receive, at the network server from a second MDD of the group of networked MDDs, additional information regarding the incident, the second MDD being different from the first MDD;
automatically record a timestamped log entry of the additional information; and
automatically send a push notification to the group of networked MDDs other than the second MDD, the push notification containing the timestamped log entry of the additional information.

16. The computer program product of claim 15, wherein the visual map selection includes a cursor overlaying a map image.

17. The computer program product of claim 16, wherein the map image is a satellite aerial view image.

18. The computer program product of claim 15, wherein the visual map selection also indicates location of at least one of the first MDD or the second MDD.

19. The computer program product of claim 18, wherein the location of at least one of the first MDD or the second MDD is the current location of at least one of the first MDD or the second MDD.

20. The computer program product of claim 18, wherein the location of at least one of the first MDD or the second MDD is the current location of the first MDD and a current location of the second MDD.

* * * * *